US012587080B2

(12) United States Patent
Inoue

(10) Patent No.: US 12,587,080 B2
(45) Date of Patent: Mar. 24, 2026

(54) TRANSDUCER FOR PRODUCING VIBRATIONAL MOVEMENT

(71) Applicant: Groundwaves Ltd, London (GB)

(72) Inventor: Nicholas T Inoue, Bristol (GB)

(73) Assignee: Groundwaves Ltd, London (GB)

( * ) Notice: Subject to any disclaimer, the term of this patent is extended or adjusted under 35 U.S.C. 154(b) by 298 days.

(21) Appl. No.: 18/564,528

(22) PCT Filed: May 27, 2022

(86) PCT No.: PCT/EP2022/064489
§ 371 (c)(1),
(2) Date: Nov. 27, 2023

(87) PCT Pub. No.: WO2022/248716
PCT Pub. Date: Dec. 1, 2022

(65) Prior Publication Data
US 2024/0243648 A1     Jul. 18, 2024

(30) Foreign Application Priority Data

May 27, 2021    (GB) ..................................... 2107616

(51) Int. Cl.
H02K 33/18        (2006.01)
A43B 7/00         (2006.01)
(52) U.S. Cl.
CPC .............. H02K 33/18 (2013.01); A43B 7/00 (2013.01)
(58) Field of Classification Search
CPC ........ H02K 35/00; H02K 35/02; H02K 33/12; H02K 33/16; H02K 33/18; H02K 33/00;
(Continued)

(56) References Cited

U.S. PATENT DOCUMENTS

| 4,924,123 | A | * | 5/1990 | Hamajima | ............. | H02K 35/02 |
| | | | | | | 310/15 |
| 5,440,183 | A | * | 8/1995 | Denne | ................... | F15B 15/088 |
| | | | | | | 310/12.26 |

(Continued)

FOREIGN PATENT DOCUMENTS

| GB | 2549781 | 11/2017 |
| JP | 20175872 | 1/2017 |

(Continued)

OTHER PUBLICATIONS

CNIPA Notification of First Office Action, CN Application No. 202080083147.5 Groundwaves Ltd. Mail date Jun. 29, 2023, 11 pgs. 2023.

(Continued)

*Primary Examiner* — Maged M Almawri
(74) *Attorney, Agent, or Firm* — Patent Law Works LLP

(57)        ABSTRACT

This specification describes a transducer configured to convert electrical signals into vibrational movement. The transducer comprises an axially-magnetised reciprocating magnet, wherein the axially-magnetised reciprocating magnet comprises an aperture such that the reciprocating magnet has an inner boundary and an outer boundary.
The transducer further comprises at least two pairs of concentrically positioned electromagnetic solenoids, the at least two pairs of concentrically positioned electromagnetic solenoids being configured to drive the reciprocating magnet to reciprocate in a volume above and below the reciprocating magnet. The first solenoid of each of the pairs of concentrically positioned electromagnetic solenoids is positioned to influence the reciprocating magnet at the inner boundary more than at the outer boundary, and a second solenoid of each of the pairs of concentrically positioned electromagnetic solenoids is positioned to influence the reciprocating magnet at the outer boundary more than at the (Continued)

inner boundary. The reciprocating magnet is suspended in the mid-point of its axial travel at a null position using either mechanical springs or magnetic springs.

21 Claims, 17 Drawing Sheets

(58) Field of Classification Search
CPC .. H02K 41/02; A43B 3/34; A43B 7/00; B06B 1/04; B06B 1/045; H02N 11/00; H02N 11/002
USPC ...................................................... 310/15–28
See application file for complete search history.

(56) References Cited

U.S. PATENT DOCUMENTS

| | | | | | |
|---|---|---|---|---|---|
| 5,973,422 | A | * | 10/1999 | Clamme | H02K 33/16 310/90.5 |
| 6,501,357 | B2 | * | 12/2002 | Petro | H01H 51/2209 335/229 |
| 7,078,832 | B2 | * | 7/2006 | Inagaki | H02K 7/14 335/238 |
| 7,706,563 | B2 | | 4/2010 | Stewart | |
| 7,791,456 | B2 | * | 9/2010 | Miura | H02K 33/16 340/407.1 |
| 7,859,144 | B1 | * | 12/2010 | Sahyoun | H02K 33/16 335/229 |
| 7,898,121 | B2 | * | 3/2011 | Ramsay | H02K 41/031 74/473.23 |
| 7,948,124 | B1 | * | 5/2011 | Waters | H02K 35/00 310/36 |
| 8,097,991 | B2 | * | 1/2012 | Masami | H02K 33/16 310/15 |
| 8,456,032 | B2 | * | 6/2013 | Hochberg | F03B 13/00 290/43 |
| 8,593,017 | B2 | * | 11/2013 | Stefanini | H02K 35/02 290/1 R |
| 8,629,569 | B2 | * | 1/2014 | Roberts | H02K 35/02 290/1 R |
| 8,643,228 | B2 | * | 2/2014 | Vogel | G02B 23/2476 310/12.24 |
| 8,970,072 | B2 | | 3/2015 | Headstrom | |
| 9,385,578 | B2 | | 7/2016 | Headstrom | |
| 9,787,169 | B2 | | 10/2017 | Hiemstra et al. | |
| 9,906,109 | B2 | * | 2/2018 | Endo | H02K 33/16 |
| 10,047,717 | B1 | * | 8/2018 | Phillips | F03B 13/20 |
| 10,170,969 | B2 | * | 1/2019 | Ohishi | H02K 7/1876 |
| 10,622,538 | B2 | * | 4/2020 | Zhang | H10N 30/802 |
| 10,782,784 | B2 | | 9/2020 | Szeto | |
| 10,804,785 | B2 | | 10/2020 | Liu | |
| 10,835,924 | B1 | | 11/2020 | Williamson | |
| 11,031,857 | B2 | * | 6/2021 | Wasenczuk | H02N 2/186 |
| 11,152,843 | B2 | * | 10/2021 | Wasenczuk | H02K 1/34 |
| 11,658,555 | B2 | * | 5/2023 | Mori | H02K 33/16 310/28 |
| 11,714,490 | B2 | * | 8/2023 | Kim | H02P 25/032 345/173 |
| 11,831,214 | B2 | * | 11/2023 | Chiba | B06B 1/14 |
| 11,843,298 | B2 | * | 12/2023 | Ando | H02K 33/18 |
| 11,926,185 | B2 | * | 3/2024 | Yamazaki | B60G 17/017 |
| 11,943,599 | B2 | * | 3/2024 | Patsouras | H04R 11/14 |
| 11,973,389 | B2 | * | 4/2024 | Neubauer | H02K 33/16 |
| 2003/0034697 | A1 | * | 2/2003 | Goldner | F16F 15/03 310/15 |
| 2003/0197433 | A1 | * | 10/2003 | Cheung | H02K 35/02 310/156.01 |
| 2004/0119343 | A1 | * | 6/2004 | Ueda | G10K 9/22 310/12.31 |
| 2006/0208600 | A1 | * | 9/2006 | Sahyoun | H02K 33/16 310/254.1 |
| 2007/0182257 | A1 | * | 8/2007 | Miura | H04R 9/02 310/23 |

| | | | | | |
|---|---|---|---|---|---|
| 2008/0001484 | A1 | * | 1/2008 | Fuller | H02K 33/16 310/15 |
| 2008/0265692 | A1 | * | 10/2008 | Roberts | H02K 1/34 310/15 |
| 2009/0066168 | A1 | * | 3/2009 | Cardon | H02K 7/106 310/12.24 |
| 2010/0066182 | A1 | * | 3/2010 | Yamazaki | B06B 1/045 310/29 |
| 2010/0327672 | A1 | * | 12/2010 | Roberts | H02K 35/00 310/25 |
| 2011/0133577 | A1 | * | 6/2011 | Lee | H02K 33/18 310/15 |
| 2011/0193426 | A1 | * | 8/2011 | Chung | H02K 33/16 310/25 |
| 2011/0198948 | A1 | * | 8/2011 | Keisuke | H02K 5/225 310/25 |
| 2011/0198949 | A1 | * | 8/2011 | Furuich | H02K 33/16 310/25 |
| 2011/0260559 | A1 | * | 10/2011 | Kanai | B06B 1/16 310/25 |
| 2012/0212097 | A1 | * | 8/2012 | Wasenczuk | B06B 1/04 310/216.001 |
| 2013/0033129 | A1 | * | 2/2013 | Hong | B06B 1/045 310/25 |
| 2013/0285479 | A1 | * | 10/2013 | Kinoshita | H02K 35/02 310/12.12 |
| 2013/0342032 | A1 | * | 12/2013 | Laurent | H02K 35/04 310/306 |
| 2014/0062225 | A1 | * | 3/2014 | Kim | H02K 33/00 310/15 |
| 2014/0103751 | A1 | * | 4/2014 | Furukawa | H02K 35/02 310/25 |
| 2014/0132089 | A1 | * | 5/2014 | Jeon | H02K 33/18 310/14 |
| 2014/0203669 | A1 | * | 7/2014 | Rios--Quesada | H02K 41/02 310/12.19 |
| 2014/0265644 | A1 | | 9/2014 | Hiemstra et al. | |
| 2014/0265651 | A1 | * | 9/2014 | Kim | H02K 33/16 310/25 |
| 2015/0048694 | A1 | * | 2/2015 | Rios-Quesada | H02K 41/00 310/12.14 |
| 2015/0226197 | A1 | * | 8/2015 | Hahn | F04B 39/122 417/363 |
| 2016/0236162 | A1 | * | 8/2016 | Lucon | B06B 1/045 |
| 2016/0252071 | A1 | * | 9/2016 | Phillips | H02M 7/066 290/50 |
| 2017/0070131 | A1 | * | 3/2017 | Degner | H02K 33/00 |
| 2017/0198401 | A1 | * | 7/2017 | Phillips | H02K 35/02 |
| 2017/0288523 | A1 | * | 10/2017 | Katada | H02P 25/032 |
| 2017/0366077 | A1 | * | 12/2017 | Oonishi | H02J 50/00 |
| 2019/0207496 | A1 | * | 7/2019 | Takahashi | H02K 33/02 |
| 2020/0274432 | A1 | * | 8/2020 | Wauke | H02K 33/06 |
| 2021/0028679 | A1 | * | 1/2021 | Wasenczuk | H02K 1/34 |
| 2021/0328491 | A1 | * | 10/2021 | Takahashi | H02K 33/06 |
| 2022/0085709 | A1 | * | 3/2022 | Oonishi | B06B 1/045 |
| 2022/0093304 | A1 | | 3/2022 | Kim et al. | |
| 2023/0074890 | A1 | * | 3/2023 | Muniraju | H10N 10/13 |
| 2023/0101894 | A1 | * | 3/2023 | Takahashi | H02K 33/02 310/81 |
| 2023/0361662 | A1 | * | 11/2023 | Takahashi | B06B 1/045 |

FOREIGN PATENT DOCUMENTS

| | | | | |
|---|---|---|---|---|
| JP | 2017005872 | A | * | 1/2017 |
| TW | 202103412 | A | | 1/2021 |
| WO | 2008156770 | | | 12/2008 |
| WO | 2020045470 | A1 | | 3/2020 |
| WO | 2021105456 | A1 | | 6/2021 |

OTHER PUBLICATIONS

Combined Search and Examination Report Under Sections 17 and 18(3) for GB Application No. 1917525.6, mailed May 21, 2021, 6 pgs. 2021.

(56)             References Cited

OTHER PUBLICATIONS

Combined Search and Examination Report Under Sections 17 and 18(3) for GB Application No. 2107616.1, mailed Mar. 4, 2022, 10 pgs. 2022.
PCT International Search Report and Written Opinion; Application No. PCT/EP2020/083776 Inoue, Nicholas, International filing date of Nov. 27, 2020, date of mailing Apr. 29, 2021, 16 pages. 2021.

* cited by examiner

100

102-A1 102-A2

102-B1 102-B2

100

102-B

200

300

1200

1200

1700

1700

1700

TRANSDUCER FOR PRODUCING VIBRATIONAL MOVEMENT

FIELD

This specification relates generally to a transducer for generating vibrational movement. More specifically the specification relates to a transducer that is suitable for incorporation into portable applications, such as footwear.

BACKGROUND

The use of vibration to stimulate the human sense of touch is the area of haptic technology. As an increasing number of products evolve to include haptics, there is a requirement for transducers that are compact and efficient, but which are also capable of providing a good low frequency response.

With the human foot being particularly sensitive to touch, provision of haptic-footwear (i.e. footwear that can impart vibration to the wearer's feet) is particularly desirable. However, transducers that provide a good low frequency response are not usually well-suited in terms of size or shape for use in footwear.

Permanent magnets used in electromagnetic devices are commonly chosen to be made of rare-earth metals, due to their ability to achieve high flux density. However, the global market of the rare-earth metals needed for permanent magnets is unstable and therefore reducing the design dependency of rare-earth magnets is desirable.

SUMMARY

In a first aspect, this specification describes a transducer configured to convert electrical signals into vibrational movement. The transducer comprises an axially-magnetised reciprocating magnet mechanically supported or suspended in a null position in a plane that is between a first pair of at least two pairs of concentrically positioned electromagnetic solenoids and a second pair of the at least two pairs of concentrically positioned electromagnetic solenoids, wherein the at least two pairs of concentrically positioned electromagnetic solenoids are configured to drive the reciprocating magnet to reciprocate about the null position. The axially-magnetised reciprocating magnet comprises an aperture such that the reciprocating magnet has an inner boundary and an outer boundary. A first solenoid of each of the pairs of concentrically positioned electromagnetic solenoids is positioned to influence the reciprocating magnet at the inner boundary more than at the outer boundary, and a second solenoid of each of the pairs of concentrically positioned electromagnetic solenoids is positioned to influence the reciprocating magnet at the outer boundary more than at the inner boundary.

The axially-magnetised reciprocating magnet may be mechanically supported or suspended in the null position, by one or more spring members positioned on at least one side of the axially-magnetised reciprocating magnet. The one or more spring members may be wave springs, compression springs, expansion springs or foam rubber structures. In some examples, the one or more spring members may comprise at least one wave spring positioned on each side of the axially-magnetised reciprocating magnet.

The one or more mechanical spring members may comprise at least one spring positioned on each side of the axially-magnetised reciprocating magnet. In other examples, one or more mechanical spring members may comprise at least one elastic flexure positioned on at least one side of the axially-magnetised reciprocating magnet, wherein the elastic flexure is located external to the transducer.

The axially-magnetised reciprocating magnet may be an assembly comprised of one or more axially-magnetised permanent magnets attached to a magnetic yoke. The magnetic yoke may be shaped in a way that increases the electromagnetic coupling between the reciprocating magnetic assembly and the electromagnetic solenoids.

In a second aspect, this specification describes a transducer configured to convert electrical signals into vibrational movement, the transducer comprising at least two pairs of concentrically positioned electromagnetic solenoids, and an axially-magnetised reciprocating magnet magnetically suspended in a null position in a plane that is between a first pair of at least two pairs of concentrically positioned electromagnetic solenoids and a second pair of the at least two pairs of concentrically positioned electromagnetic solenoids. The axially-magnetised reciprocating magnet comprises an aperture such that the reciprocating magnet has an inner boundary and an outer boundary, wherein the at least two pairs of concentrically positioned electromagnetic solenoids are configured to drive the reciprocating magnet to reciprocate about the null position. The transducer further comprises at least one stationary magnet arranged to magnetically support the axially-magnetised reciprocating magnet in the null position, the at least one stationary magnet being positioned inside the inner boundary of the axially-magnetised reciprocating magnet and/or outside the outer boundary of the axially-magnetised reciprocating magnet. A first solenoid of each of the pairs of concentrically positioned electromagnetic solenoids is positioned to influence the reciprocating magnet at the inner boundary more than at the outer boundary, and a second solenoid of each of the pairs of concentrically positioned electromagnetic solenoids is positioned to influence the reciprocating magnet at the outer boundary more than at the inner boundary.

The at least one stationary magnet may be made up of a plurality of smaller magnets which surround the axially-magnetised reciprocating magnet on the inner boundary of the axially-magnetised reciprocating magnet and/or outside the outer boundary of the axially-magnetised reciprocating magnet. The axially-magnetised reciprocating magnet may have extended pole pieces attached to the axial poles of the magnet. The extended pole pieces attached to the axial poles of the magnet may be made of a ferromagnetic material.

For both the first and second aspect, when viewed along the axis of reciprocation of the axially-magnetised reciprocating magnet, the first solenoid of each of the pairs of concentrically positioned electromagnetic solenoids may be located within the aperture of the reciprocating magnet, and the second solenoid of each of the pairs of concentrically positioned electromagnetic solenoids may be located outside the outer boundary of the reciprocating magnet.

The transducers of both of the first and second aspects may include a central guide member. In such examples, a volume in which the reciprocating ring magnet is driven to reciprocate surrounds the central guide member and the central guide member extends through the aperture of the reciprocating magnet. The at least two pairs of concentrically positioned electromagnetic solenoids is configured to drive the reciprocating magnet to reciprocate along a length of the central guide member.

The transducers of both of the first and second aspects may include an outer guide member surrounding and defining an outer boundary of the volume in which the reciprocating magnet is driven to reciprocate. An outer surface of the central guide member that may be adjacent the inner boundary of the reciprocating magnet and an inner surface of the outer guide member that may be adjacent the outer boundary of the reciprocating magnet may be formed of a material which reduces friction between the reciprocating magnet and the central and outer guide members.

The second solenoid of each of the pairs of concentrically positioned electromagnetic solenoids may be located within, or form part of, the outer guide member. The first solenoid of each of the pairs of concentrically positioned electromagnetic solenoids may be located within, or form part of, the central guide member. The central guide member may include a central guide member fluid channel extending through a central region of the central guide member to allow fluid to pass through the central region of the central guide member between a first end of the central guide member and a second end of the central guide member and at least one second fluid channel configured to allow fluid to pass between the volume in which the axially-magnetised reciprocating magnet is driven to reciprocate and the first end of the central guide member fluid channel, and may include at least one third fluid channel configured to allow fluid to flow between the volume in which the axially-magnetised reciprocating magnet is driven to reciprocate and a second end of the central guide member fluid channel. The reciprocating magnet may comprise a first main surface which faces the first axially-magnetised stationary magnet, a second main surface which faces the second axially-magnetised stationary magnet, an inner surface extending between the first and second main faces at the inner boundary of the reciprocating magnet, and an outer surface extending between the first and second main faces at the outer boundary of the reciprocating magnet. An edge of the first solenoid of a first of the pairs of concentrically positioned electromagnetic solenoids may be positioned adjacent an edge of the reciprocating magnet that connects the first main surface and the inner surface. An edge of the first solenoid of a second of the pairs of concentrically positioned electromagnetic solenoids may be positioned adjacent an edge of the reciprocating magnet that connects the second main surface and the inner surface. An edge of the second solenoid of a first of the pairs of concentrically positioned electromagnetic solenoids may be positioned adjacent an edge of the reciprocating magnet that connects the first main surface and the outer surface. An edge of the second solenoid of a second of the pairs of concentrically positioned electromagnetic solenoids may be positioned adjacent an edge of the reciprocating magnet that connects the second main surface and the outer surface.

BRIEF DESCRIPTION OF THE FIGURES

For better understanding of the apparatuses and methods described herein, reference will now be made by way of example to the accompanying drawings, whereby in which.

DETAILED DESCRIPTION

Figures 1A, 1B:
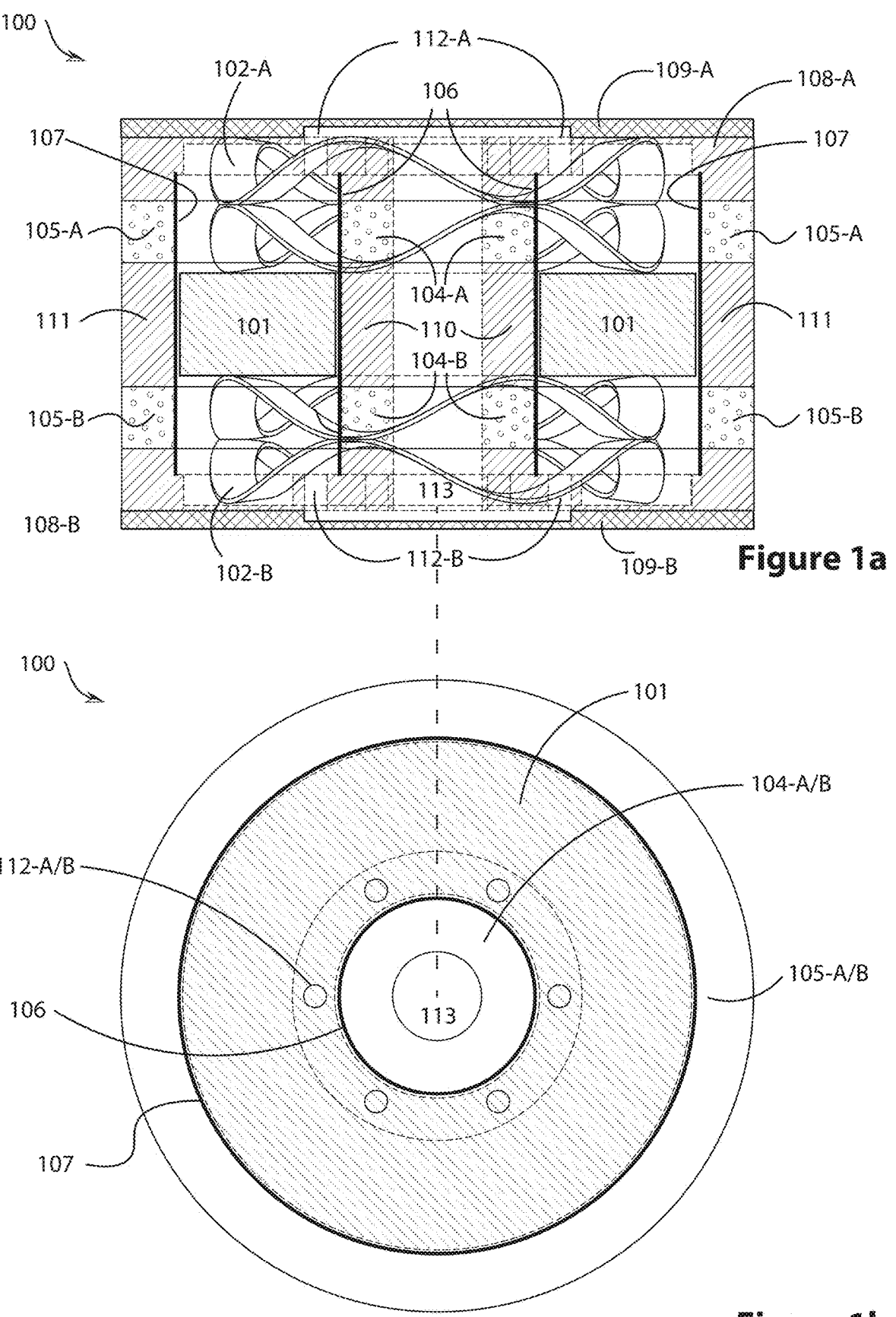
FIG. 1a and FIG. 1b shows two views of a transducer configured to convert electrical signals into vibrational movement.

In the description and drawings, like reference numerals refer to like elements throughout.

This specification relates generally to a transducer that has a good low frequency response and that is configured to be suitable for vibratory stimulation to the user based on an input audio signal (for instance, a musical composition or the audio component of AV content such as a movie or video game).

An example of such a transducer 100 is illustrated in FIG. 1a and FIG. 1b, which each show a different view of the transducer 100.

The transducer 100 comprises an axially-magnetised reciprocating magnet 101 mechanically suspended between first and second spring members 102-A, 102-B, located on opposing sides of the axially-magnetised reciprocating magnet 101. The springs 102-A, 102-B are chosen such that they maintain the axially-magnetised reciprocating magnet 101 in the mid-point of its axial travel, whereby the reciprocating magnet rests at an equilibrium position (i.e. is suspended) between the two springs 102-A, 102-B. This equilibrium position may sometimes be referred to as the 'null position' of the reciprocating magnet 101.

Put another way, if one pair of concentrically positioned electromagnetic solenoids 104-A, 105-A are considered on an upper plane, the other pair of concentrically positioned electromagnetic solenoids 104-B, 105-B are considered on a lower plane. The null position is at a plane in-between the upper and lower plane. The null position plane may be but not necessarily, equidistant from the upper plane and lower plane.

The axially-magnetised reciprocating magnet 101 comprises an aperture such that the reciprocating magnet has an inner boundary and an outer boundary. A possible form for the reciprocating magnet, which has been illustrated in the accompanying drawings, is that of a ring magnet (and reciprocating magnet may sometimes be referred to as a ring magnet herein). Although there may be benefits associated with using a ring magnet, other configurations of the reciprocating magnet could instead be used. For instance, the outer boundary/perimeter of the ring magnet may be square, hexagonal or of any other shape. The inner boundary/perimeter may be of the same shape at the outer boundary or may be of a different shape. In order to ensure a shallow depth for the transducer, it may be desirable for the diameter/width of the reciprocating magnet to be greater than the depth. In some particular implementations which have been found to work well, the reciprocating ring magnet 101 has a diameter of approximately 50 mm. However, the applicability of the concepts described herein is, of course, not limited only to use with reciprocating magnets having such a diameter.

The transducer 100 further comprises at least two pairs of concentrically positioned electromagnetic solenoids 104-A, 105-A and 104-B, 105-B. The two pairs may be referred to as an upper pair and a lower pair, where both solenoids of a particular pair are positioned on the same side of the reciprocating magnet 101. These solenoids are configured to drive the reciprocating magnet 101 to reciprocate in a volume at least partially occupied by the first and second springs 102-A, 102-B. More specifically, a first solenoid 104-A, 104-B of each of the pairs of concentrically positioned electromagnetic solenoids (which may be referred to as the inner solenoid of the pair) is positioned to influence the reciprocating magnet 101 at the inner boundary more than at the outer boundary, and a second solenoid 105-A, 105-B of each of the pairs of concentrically positioned electromagnetic solenoids (which may be referred to as the outer solenoid of the pair) is positioned to influence the reciprocating magnet at the outer boundary more than at the inner boundary. When viewed along the axis of reciprocation of the axially-magnetised reciprocating magnet, the first (inner) solenoid 104-A, 104-B of each of the pairs of concentrically positioned electromagnetic solenoids is located within the aperture of the reciprocating magnet 101, and the second (outer) solenoid 105-A, 105-B of each of the pairs of concentrically positioned electromagnetic solenoids is located outside the outer boundary of the reciprocating magnet 101.

In some examples, each solenoid may comprise a single coil of conducting material (e.g. wire). However, the solenoids may have any suitable form provided that they fulfil their function of driving the reciprocating magnet in the manner described herein.

The aperture provided in the reciprocating magnet provides two edges of the magnet that may be influenced by each of the pairs of the solenoids. In contrast, if the reciprocating magnet were not to have a central aperture, only one edge, the outer boundary, of the magnet could be influenced. This improves the responsiveness of the transducer and allows a heavier magnet to be used, for a given available axial length, which improves the performance of the transducer at low frequencies. It also provides for greater efficiency of the transducer such that a greater area of the reciprocating ring magnet 101 is being influenced by the solenoids.

It may be beneficial to place the inner axial surface extents of the solenoids at a close distance to the outer axial surface extents of the ring magnet 101. This enables the transducer to benefit from the regions of highest magnet flux of both the reciprocating magnet 101 and the solenoids. The concentric placement of the two solenoid pairs at a short axial distance, above and below the equilibrium position of the reciprocating ring magnet 101, provides four regions of magnetic influence upon the reciprocating magnet 101. Put another way, one solenoid pair is provided on one side of the reciprocating magnet's axis, and the second solenoid pair 105-*b*, 104-*b* is provided on the opposing side. Put yet another way, an edge of the first solenoid of a first of the pairs of concentrically positioned electromagnetic solenoids is positioned adjacent to an edge of the reciprocating magnet that connects a first main surface of the reciprocating magnet, which faces the first axially-magnetised stationary magnet, and an inner surface of the reciprocating magnet at the inner boundary of the reciprocating magnet, which extends between the first main surface and a second main surface of the reciprocating magnet which faces the second axially-magnetised stationary magnet. In addition, an edge of the first solenoid of a second of the pairs of concentrically positioned electromagnetic solenoids is positioned adjacent to an edge of the reciprocating magnet that connects the second main surface and the inner surface of the solenoid. Further, an edge of the second solenoid of the first of the pairs of concentrically positioned electromagnetic solenoids is positioned adjacent to an edge of the reciprocating magnet that connects the first main surface and the outer surface, which extends between the first and second main faces at the outer boundary of the reciprocating magnet. Also, an edge of the second solenoid of the second of the pairs of concentrically positioned electromagnetic solenoids may be positioned adjacent an edge of the reciprocating magnet that connects the second main surface and the outer surface.

The two inner solenoids 104-A, 104-B are separated by a central spacer 110 and the two outer solenoids 105-A, 105-B are separated by an outer spacer 111. The height of the central and outer spacers therefore defines the axial distance between the reciprocating magnet 101 and each of the two solenoid pairs, 105-A, 104-A and 105-B, 104-B. Selection of this axial distance is an important consideration in the design of the transducer. This is because a longer spacer means that reciprocating ring magnet 101 has a longer available axial excursion in which to accelerate, and so may thus generate a greater force.

The central axial stack of the inner solenoids 104-A and 104-B, along with the central spacer 110, form a structure having an outer surface which is adjacent to the inner boundary formed by the aperture of the reciprocating ring magnet 101. This stack provides a guide member (the central guide member) for the ring magnet 101. The central guide member passes through the aperture and the reciprocating magnet 101 is driven to reciprocate along its length. The central guide member also serves as a central linear bearing surface.

The outer axial stack of the outer solenoids 105-A and 105-B, along with the outer spacer 111 forms a structure having an inner surface which is adjacent to the outer boundary of the reciprocating ring magnet 101. The inner surface of the outer axial stack defines an outer boundary of the volume in which the reciprocating magnet is driven to reciprocate. The outer axial stack forms an outer guide member for the ring magnet 101 and also serves as an outer linear bearing surface.

For a linear bearing to maintain free motion along a guide member, the coefficient of friction between the linear bearing and guide member must be below a certain value (X), for a given ratio between the bearing length and the lever-arm distance of the applied force (which is dependent on the diameter or width of the reciprocating magnet). This avoids stick-slip effects during dynamic motion of the reciprocating magnet, which may temporarily bind with the guide member's surface, resulting in non-linear motion.

The arrangement of transducer 100 has the benefit of two guide members serving as linear bearing surfaces. This serves to reduce the occurrence of the slip-stick effect. This is because it increases the critical value (X) below which free motion is maintained and above which stick-slip can occur. This provides the opportunity to employ a longer lever-arm for a given bearing length.

For the application of a transducer 100 described herein, utilising an inner and outer guide member allows for the axial length (i.e. the depth) of the reciprocating ring magnet 101, i.e. the bearing length, of the reciprocating ring magnet 101 to be shorter than were the apparatus to use only a single guide member, whilst avoiding stick-slip binding of the reciprocating member on such guides. Such reduction in axial length lends to a reduction in the overall profile of the transducer.

As mentioned above, in order to avoid stick-slip, it is beneficial to reduce the coefficient of friction between the dynamic and static parts. As such, as illustrated in, FIGS. 1A and 1B, the transducer 100 may include elements 106 and 107 which are static surfaces adjacent and affixed to the outside of the central axial stack, and the inner surface of the outer axial stack The static surfaces 106 and 107 may form part of the central and outer guide members respectively. Specifically, static surface 106 is adjacent to the inner boundary of the reciprocating magnet 101 and static surface 107 is adjacent to the outer boundary of the reciprocating magnet 101.

The static surfaces 106 and 107 may be formed, coated or have layered on, a material which reduces friction between the reciprocating magnet 101 and the central and outer guide members. One material which has proven to work effectively is sleeves of epoxy impregnated cardboard with a graphite coating.

In addition or alternatively, the reciprocating ring magnet 101 may also be coated with, or have layered onto it, low friction materials. Furthermore the reciprocating ring magnet 101 may be assembled into, or be cast as, a sabot, which may be formed from, or be coated with, a low friction material. The low friction layer or coating should be of adequate thickness to maintain low friction over a long period despite abrasion occurring due to reciprocation of the magnet.

Whether it is the guide members which feature low-friction surface layers and/or the reciprocating ring magnet 101, the gap between the reciprocating ring magnet's magnetic surface, and the solenoids' magnetic surface should, ideally, be minimal so as to increase the transducer's electromechanical efficiency.

Where such transducer 100 is to be mass produced, the entire frame assembly, including the solenoids but without the elements 108-A 109-A, may be formed in a single operation. Plastics that have inherent resilience to temperature changes whilst providing a long term abrasion resistant low friction surface may be used. An example of a good material may be PEEK or a PEEK and PTFE composite.

The gap between the reciprocating ring magnet 101 and the central guide member's low friction surface should be minimised for two reasons. Firstly a minimal gap reduces the amount of axial misalignment allowable. This serves to ameliorate undesirable mechanical resonance modes of the ring magnet 101 during dynamic movement (whilst, of course, allowing a gap large enough to provide free motion of the ring magnet 101). The second aspect to consider in relation to the gap relates to the working fluid that surrounds the reciprocating ring magnet 101 and forms a volume 114 in between the central and outer guide member and within which the ring magnet 101 reciprocates. The gap should be chosen such that the fluid surrounding ring magnet 101 is directly influenced upon movement of the ring magnet 101 but such that there is no significant flow of fluid between the central guide member and the inner surface of the aperture of reciprocating ring magnet 101 and between the outer surface of the ring magnet 101 and the inner surface of the outer guide member. If concentric tolerances in the order of 10's of microns are obtained between the static and dynamic surfaces, and if the dynamic viscosity of the fluid is low, a gap may be chosen such that the reciprocating ring magnet 101 rides smoothly on the guide members with a thin film of the fluid which surrounds it, providing self-lubrication, as with an air bearing when the fluid is a gas.

The central guide member, and outer guide member are held in concentric formation by connecting surfaces 108-A and 108-B that span between the inner guide member and the outer guide member at either end of the guide members. These may be referred to as upper and lower (or first and second) connecting surfaces 108-A and 108-B.

Aside from providing a connecting surface between the inner and outer guide member, the connecting surface may hermetically seal the volume 114 in which the reciprocating ring magnet 101 is to move. The fluid within the volume 114 may serve to resist or dampen the reciprocating movement of the magnet. This may have some benefits such as dampening external shocks. Further in some implementations, the fluid (e.g. a gas composition) may be chosen (or omitted altogether, e.g. as in a vacuum) so as to produce a particular level of damping (which depends on the compressibility) and/or to provide a particular frequency response for the transducer.

However, the main application for the transducer is to generate reactive force from a moving mass. Therefore allowing a maximum peak-peak amplitude displacement of the reciprocating magnet 101 is generally desirable. As such, it may be desirable to have as little restriction to the movement of the reciprocating magnet as possible to improve overall electromechanical efficiency of the transducer 100. Therefore connecting surfaces 108-A and 108-B may have an orifice or a number of orifices 112-A and 112-B, that allows fluid to flow in-and-out of the volume that is created in between the central guide member and outer guide member, under influence from the motion of reciprocating ring magnet 101. However, for the use of a tactile transducer that works on the effect of the reaction force generated by a moving mass, such flow may be used in a more suitable manner. In particular, the central guide member may include an aperture 113 that extends axially throughout the central guide member 104-B, 110, 104-A and connects at either end to the volume 114 via the one or more orifices 112-A, 112-B. For instance, the solenoids 104-A and 104-B may be wound or otherwise configured so that they have a central aperture 113, which may be referred to as a central guide member fluid channel 113. This fluid channel 113 in the central guide member enables the fluid which is directly influenced by the movement of the reciprocating ring-magnet 101 to be redirected in a beneficial manner.

Specifically, the fluid can be urged by the movement of the reciprocating magnet 101 out of the volume on a first side of the magnet 101 (i.e. the side towards which the magnet 101 is moving) through a second fluid channel (of which the orifice(s) e.g. 112-A in one of the connecting surfaces e.g. 108-A are part) and into the central guide member fluid channel 113. From the central guide member fluid channel 113, the fluid flows through a third fluid channel (of which the orifice(s) e.g. 112-B in the other one of the connecting surfaces e.g. 108-B are part) into the portion of the volume 114 on the other side of the ring magnet 101.

In this way, compressive loss/damping can be avoided. The first and second fluid channels that connect the volume to 114 to the central guide member fluid channel 113 may be completed with a simple disc featuring a recess which is sealed to the outer axial surface of elements 108-A and 108-B, illustrated in transducer 100 by elements 109-A and 109-B.

Another benefit arising from this arrangement of fluid channels is that the heat generated in the solenoids in the central guide member 104-A and 104-B may be effectively transferred to the fluid present within the transducer 100 by the oscillating movement of fluid that results from the movement of reciprocating ring magnet 101. An increase in power delivered to the solenoids results in increased resistive heating, but is accompanied by a faster flow transfer rate of coolant through the central member aperture 113. This approach to dissipating heat may be preferable to other approaches since the use of certain thermally conducting materials (e.g. aluminium or copper) within the transducer may result in eddy currents which would potentially be problematic to performance of the transducer.

The fluid within the transducer may be a liquid or gas. If a liquid were to be used, such liquids that have magnetic micro-particle constituency may enable the frequency response of the transducer 100 to be modified by an external magnetic field. However, where minimal restriction of the reciprocation of ring magnet 101 is desirable, a gas may be preferable. The gas may be air or dry nitrogen, or may be a gas which is particularly effective at thermal transfer, such as helium or hydrogen.

When the heat from the inner solenoids is transferred to the fluid contained within the transducer 100, it is then transferred to the reciprocating ring-magnet 101 and also to the outer solenoids 105-A and 105-B, which results in the transducer being heated more evenly across the device. The thermal heat may then be managed by extracting it from the outer member solenoids 105-A and 105-B by using a thermal pathway which may be a thermally conductive band which may be a metal such as copper or aluminium, or may be a heat-pipe assembly, either of which will lead to a heat-sink external to the transducer 100.

Aggressive motion of the reciprocating magnet 101 may result in the reciprocating magnet bottoming out springs 102-A and 102-B with enough force to damage either the reciprocating magnet 101 or the springs 102-A and 102-B. As such, the transducer may further include a material which can absorb shock and stop aggressive impacts between the reciprocating magnet and the springs. Such a material may be a rubber. For instance, Sorbothane rubber exhibits useful characteristics, such that the dampening of shock from an impact is effective at reducing bounce, resulting in less audible sound generated from the impact.

Such shock absorbing material may be located either on the dynamic reciprocating magnet 101 and may form part of its construction in a low-friction sabot, or may be located on the connecting surfaces 108-A/B, that face the reciprocating ring magnet 101.

Spring members 102-A, 102-B are illustrated as wave springs. Wave springs have advantages over helical coil springs in that they take up less axial space and weigh less. The reduction in the height of the transducer, and the reduction in the weight of the suspension system may be particularly desirable.

When the reciprocating magnet spring suspension is chosen to be located near to the electromagnetic solenoids, the spring will be subject to a changing magnetic field and hence should be constructed of a material which does not significantly interfere with the magnetic field and consequently the transducer response. Additional care must be taken to eliminate or reduce eddy currents being induced in the spring if it is made of a conductive material. Accordingly, the spring(s) may be formed of a low or non-electrically conductive material. This may help overcome eddy current problems.

Suitable materials for the spring(s) may include, but are not limited to: the metals, stainless-steel, Elgiloy or phosphor-bronze, or durable plastic composites such as PEEK or polyetherimide.

The springs may be anchored to either the static connecting surfaces 108-A and 108-B, the moving reciprocating magnet 101, or both components. Anchoring the springs stops them becoming unseated out of their containment groove which may be located in connecting surface 108-A, or to rotate undesirably under vibration.

Figure 2:
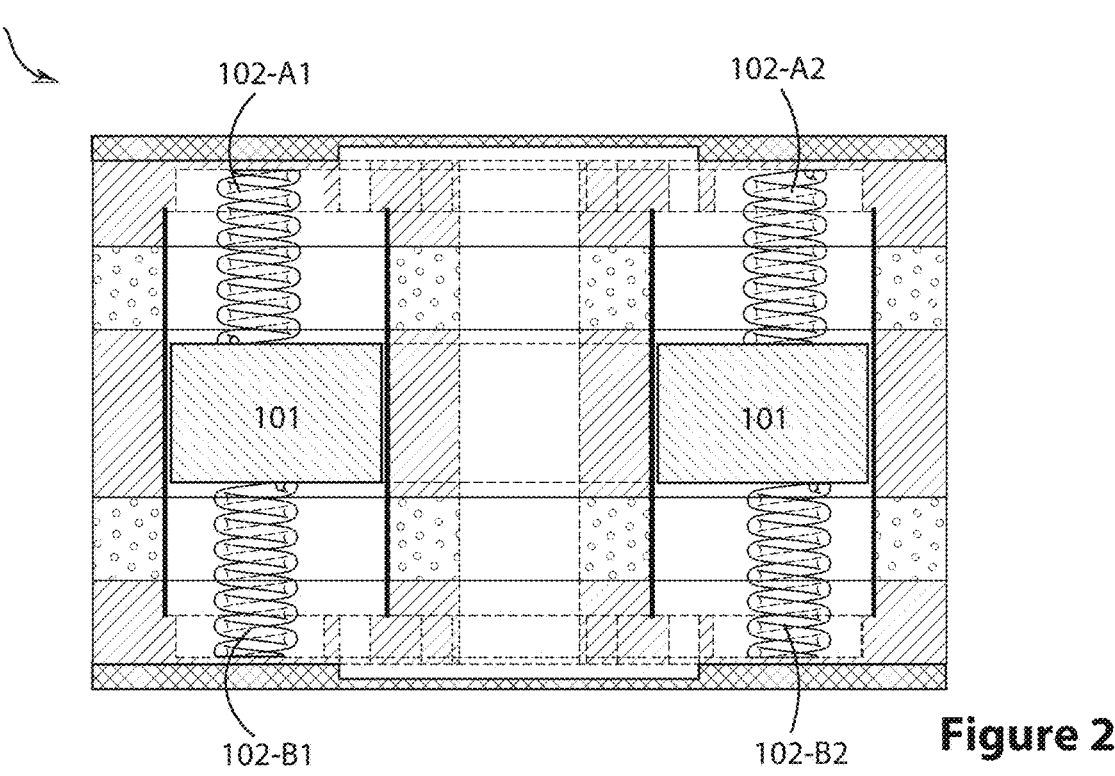
FIG. 2 shows an arrangement of FIG. 1 with an adapted reciprocating magnet spring-suspension system.

FIG. 2 illustrates a variation of the configuration of FIG. 1 whereby the wave springs 102-A and 102-B that suspend the reciprocating magnet 101 in the null position are replaced with a plurality of either compression or expansion springs. These are illustrated in FIG. 2 by 102-A1 and 102-A2 above the reciprocating magnet 101 and 102-B1 and 102-B2 below the reciprocating magnet 101. The compression or expansion springs face the reciprocating magnet 101, and are arranged equally around the axis common to that of the movement of the reciprocating magnet.

Figure 3:
FIG. 3 shows an arrangement of FIG. 1, with simplified reciprocating magnet spring-suspension system.
Figure 3:
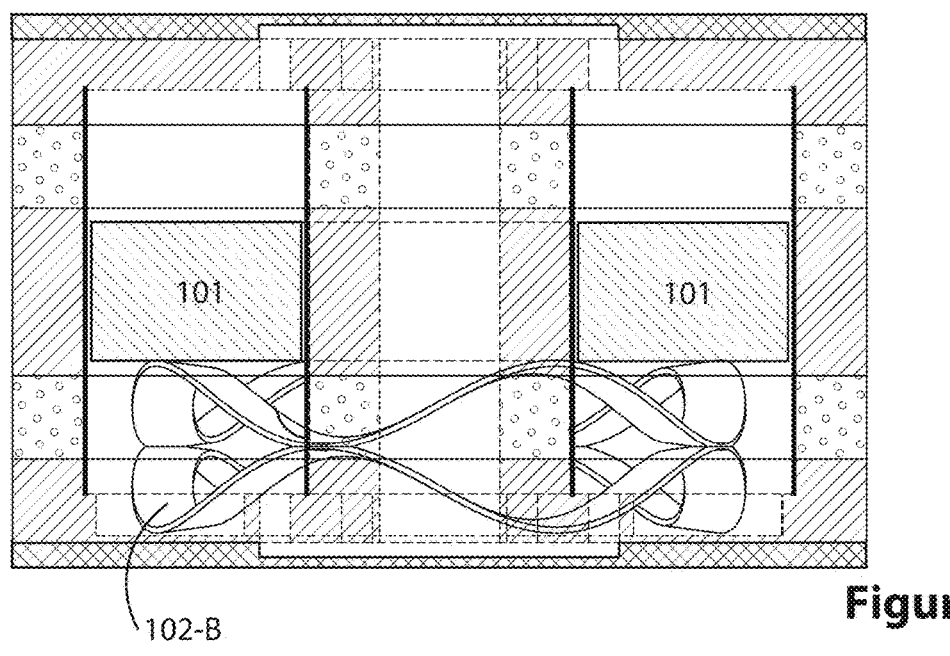

FIG. 3 illustrates a variation of the configuration of FIG. 1 whereby the reciprocating magnet 101 is suspended in the null-position using a single wave spring 102-B.

Figure 4A:
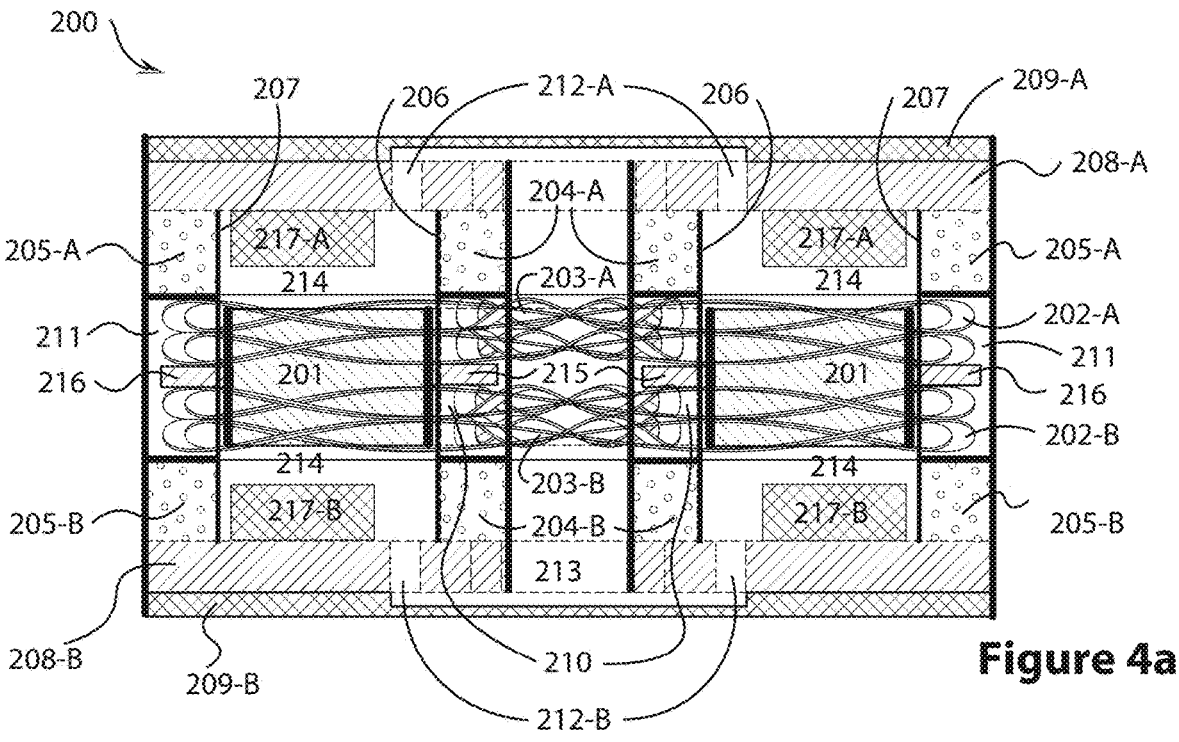
FIG. 4a and FIG. 4b shows two states of operation of a transducer with a reciprocating magnet, spring-suspension system which is compact.
Figure 4B:
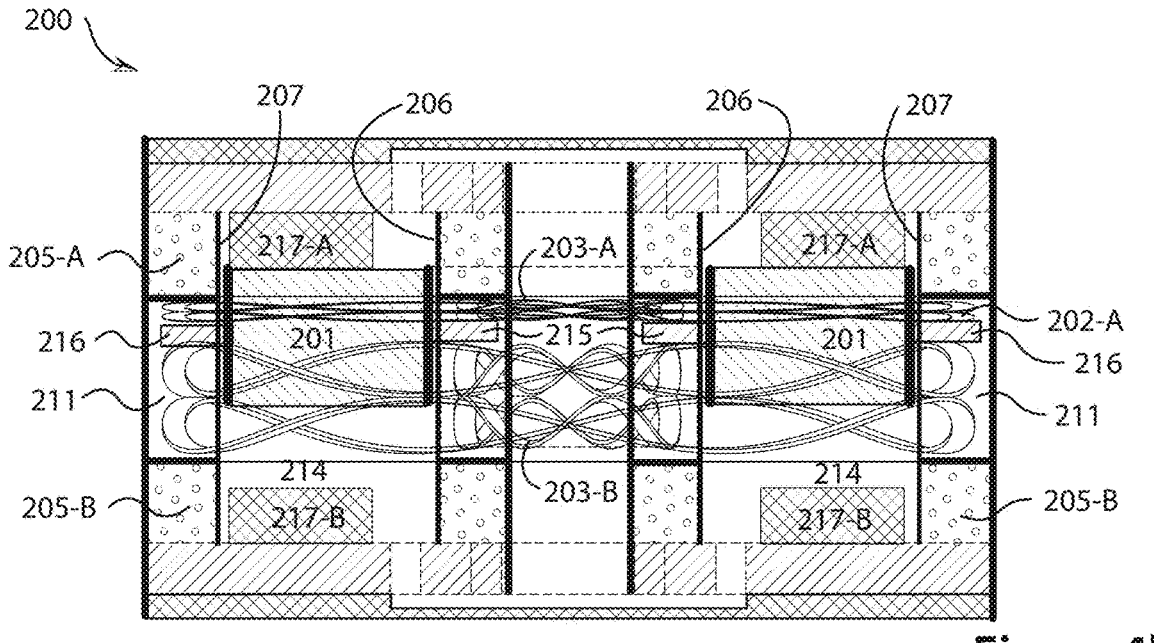

FIG. 4*a* and FIG. 4*b* illustrate transducer 200 whereby FIG. 4*a* illustrates reciprocating magnet 201 in the null position, whereas FIG. 4*b* illustrates the reciprocating magnet 201 at the maximum extent of travel along the axis of reciprocation.

Configuration 200 of FIG. 4*a* and FIG. 4*b* features a mechanical spring-suspension of reciprocating magnet 201, contained within the inner 210 and outer 211 vertical concentric space, in between concentric solenoid pairs 204-A, 205-A and 204-B and 205-B, replacing the inner and outer spacers of configuration 100 of FIG. 1. The suspension may be accomplished by two sets of wave springs 203-A/203-B and 202-A/202-B which are mounted within the inner space 210 and within the outer spacer 211 respectively. The reciprocating magnet 201 may be mechanically connected to the inner and outer concentric springs via radial arms which extend outward 216 from the outer boundary of the reciprocating magnet 201 and inward 215 from the inner boundary of the reciprocating magnet. The radial arms 215 and 216 pass through vertical slots in the inner static surface 206 and outer static surface 207.

The configuration 200 is particularly advantageous if vertical space is at a premium. The extent of vertical travel of the reciprocating magnet 201 should be limited such that the radial inner arms 215 and radial outer arms 216 extending from reciprocating magnet 201 do not impact with the end travel of the vertical slots of the inner 206 and outer 207 static surfaces, and additionally that the wave springs 203-A/203-B and 202-A/202-B do not bottom out. This may be accomplished using a shock absorbent material that limits the vertical travel of the reciprocating magnet 201, and which may be located on the reciprocating magnet assembly 201, or as illustrated in FIG. 4a and FIG. 4b, by 217-A and 217-B, located on the static connecting surfaces 208-A, facing the upper face of the reciprocating magnet 201, and on the opposing, lower connecting surface 208-B facing the lower face of the reciprocating magnet.

Figures 5A, 5B, 5C:
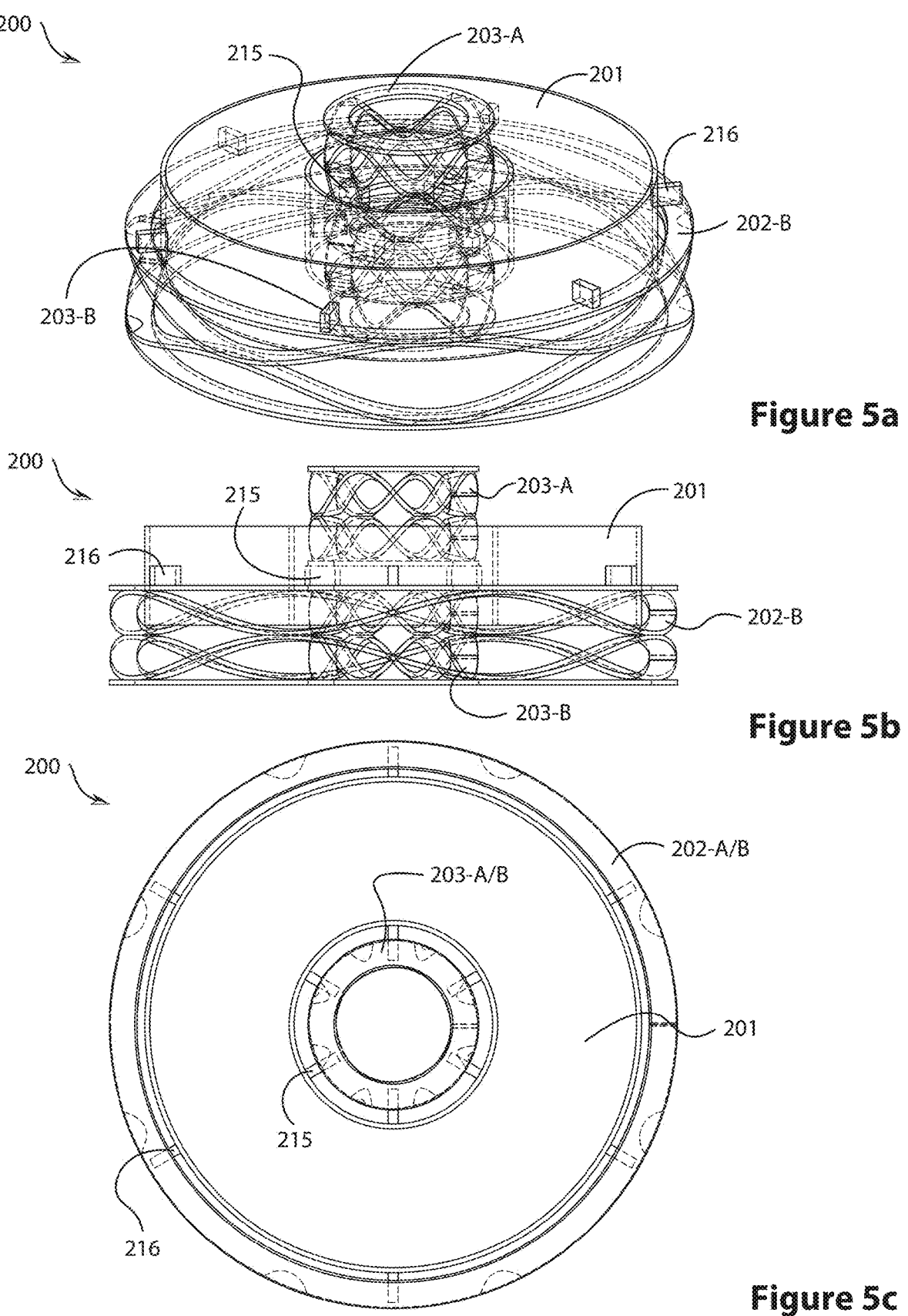
FIGS. 5a to 5c depict further clarification of the reciprocating magnet spring-suspension system that is illustrated in FIGS. 4a and 4b.

FIG. 5a, FIG. 5b and FIG. 5c are further illustrations to describe configuration 200, where FIG. 5a shows a general view of the reciprocating magnet 201 and how the radial arms may connect to the wave springs. FIG. 5b shows a side view. FIG. 5c shows a top view, in the same axis as the axis of reciprocation.

Figure 6:
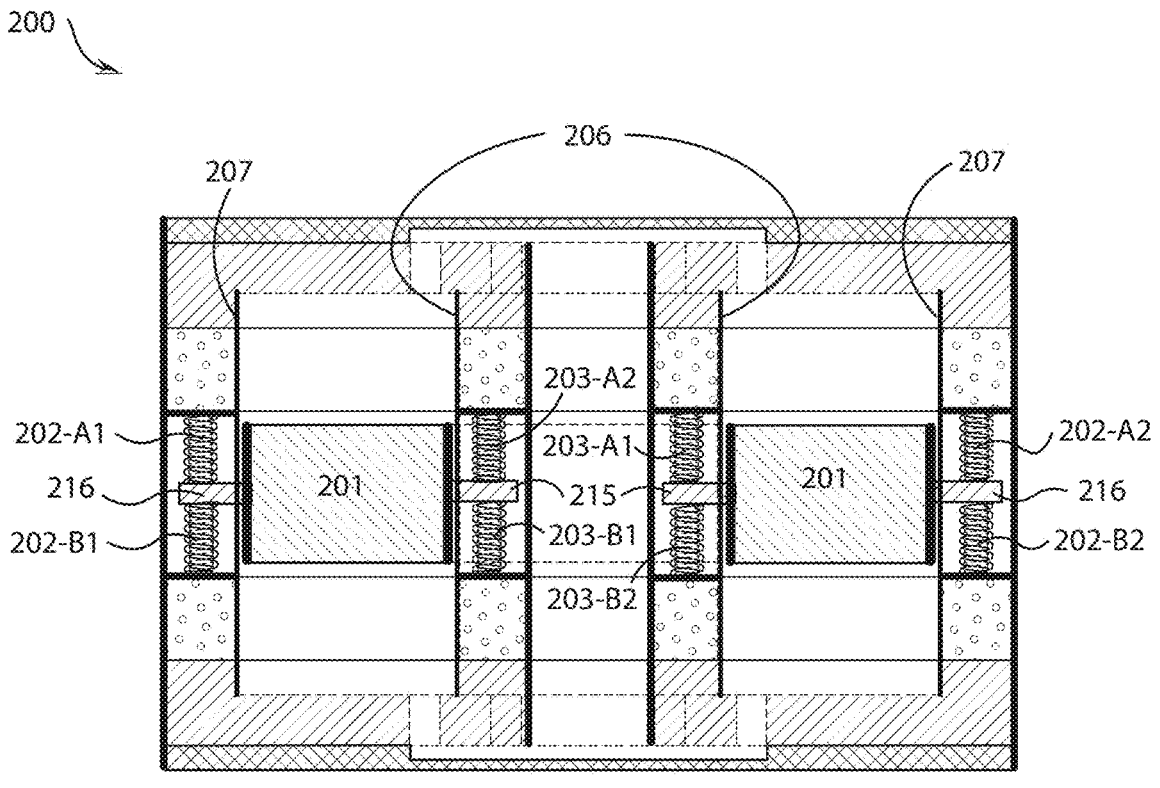
FIG. 6 illustrates an adaption of the transducer shown in FIG. 4, using adapted spring types.

FIG. 6 illustrates a variation of the transducer 200 of FIG. 4, whereby the inner wave springs 203-A/B and the outer wave springs 202-A/B that suspend the reciprocating magnet 201 in its null position via radial arms 215 and 216, which pass through the inner 206 and outer 207 static surfaces, are instead replaced by a plurality of compression or extension springs. These may be spaced equally around the axis of reciprocation. In FIG. 6, the springs are illustrated by numerals 202-A1, 202-A2, 203-A1, 203-A2 above the radial arms 215 and 216 and 202-B1, 202-B2, 203-B1, 203-B2 below the radial arms 215 and 216.

Figure 7:
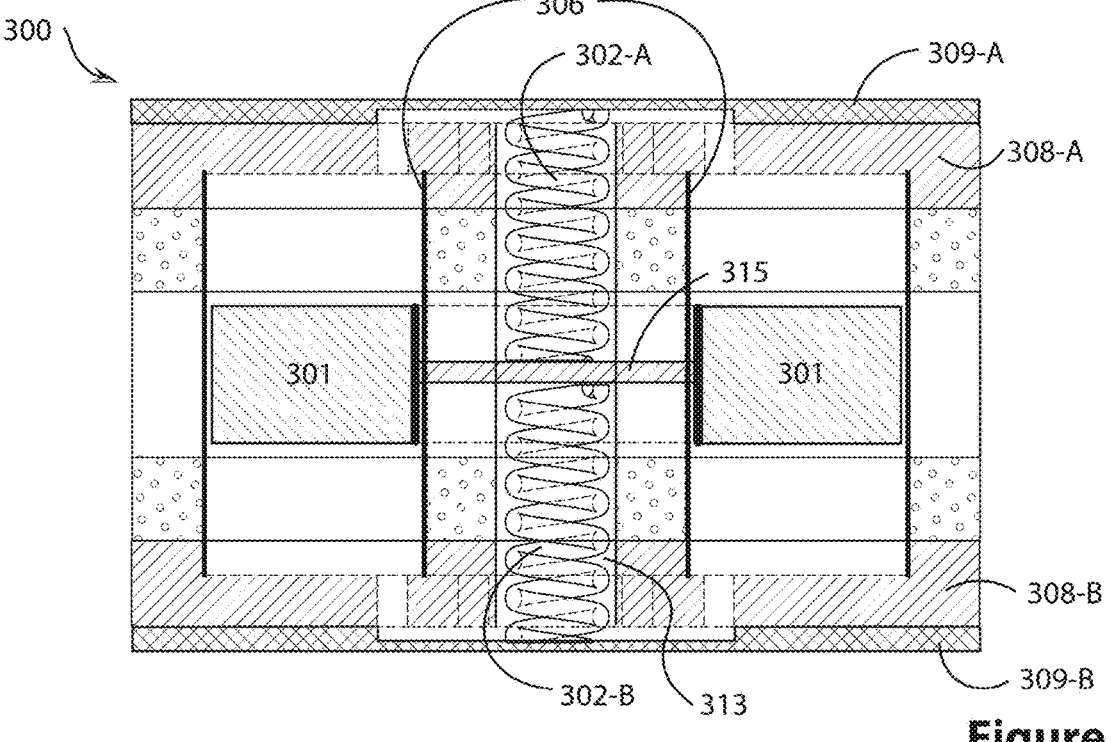
FIG. 7 illustrates a transducer configuration which uses a centrally located reciprocating magnet spring-suspension.

FIG. 7 illustrates transducer 300 whereby the reciprocating magnet 301 may be suspended in the null position by using one or more compression or extension springs 302-A and 302-B. In the example of FIG. 7, compression or extension springs 302-A/B may be located within the central fluid channel 313 of the central guide member. One side of an upper spring 302-A may be anchored to the upper recessed disk 309-A and the other side anchored to an upper side of a radial arm 315. One side of a lower spring 302-B may be anchored to the lower recessed disk 309-B and the other side to the lower side of the radial arm 315. The radial arm 315 mechanically connects the springs 302-A/B to reciprocating magnet 301 via vertical slots which pass through the inner static surface 306.

Figure 8:
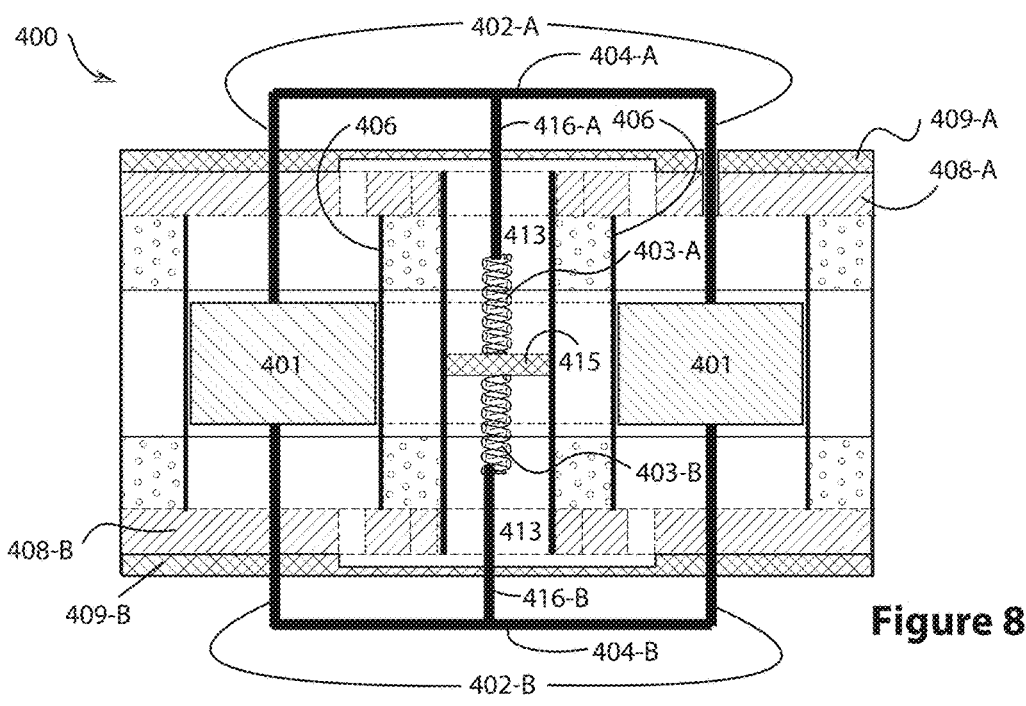
FIG. 8 shows a transducer configuration which is an adaption of FIG. 7, having a centrally located, reciprocating magnet spring-suspension.

FIG. 8 illustrates transducer configuration 400 wherein the reciprocating magnet 401 may be suspended in the null position using two compression or two extension springs 403-A and 403-B. The compression or extension springs may be located within the central fluid channel 413 of the central guide member. One side of each of the spring(s) may be anchored to an arm 415 which is oriented perpendicular to the axis of the central guide member, extending across, but not blocking, the central fluid channel, at a position adjacent to the null position of the reciprocating magnet 401.

An upper spring 403-A and lower spring 403-B are mechanically connected to the reciprocating magnet 401 via a mechanical beam construction. In the mechanical beam construction, two or more vertical beams may extend perpendicular from and joined to the face of the reciprocating magnet 401. The upper face of the magnet may be joined to upper beams 402-A and the lower face of the magnet may be joined by lower beams 402-B. The upper beams 402-A extend through the upper connecting surfaces 408-A and the upper recessed disc 409-A and the lower beams 402-B extend through the lower 408-B connecting surface and the lower recessed disc 409-B and lower recessed disc 409-B. The upper and lower vertical beams protrude a distance that may be in excess of half the maximum axial displacement distance of the reciprocating magnet 401, to allow for full axial travel of the reciprocating magnet 401. The upper vertical beams 402-A which protrude perpendicularly from the outer face of the upper recessed disk 409-A may be joined at their ends to an upper horizontal beam 404-A. The lower vertical beams 402-B which protrude perpendicularly from the outer face of the lower recessed disk 409-B may be joined at their ends to a lower horizontal beam 404-B.

The upper horizontal beam 404-A is connected to the upper spring 403-A by upper central beam 416-A. Where upper central beam 416-A is joined perpendicularly to upper horizontal beam 404-A, and passes through the upper recessed disc 409-A and the upper connecting surface 408-A, into the central fluid channel. The end of the upper central beam 416-A forms an anchor point for one side of the upper spring 403-A, where the other side of the spring may be anchored to arm 415.

The lower horizontal beam 404-B is connected to the lower spring 403-B by lower central beam 416-B. Where lower central beam 416-B is joined perpendicularly to lower horizontal beam 404-B, and passes through the lower recessed disc 409-B and the lower connecting surface 408-B, into the central fluid channel. The end of the lower central beam 416-B forms one anchor point for the lower spring 403-B, where the other side of the spring may be anchored to arm 415.

As will be appreciated, when the reciprocating magnet 401 is driven to reciprocate, the configuration of beams 402, 404, which is joined to the magnet, also reciprocates.

Figure 9:
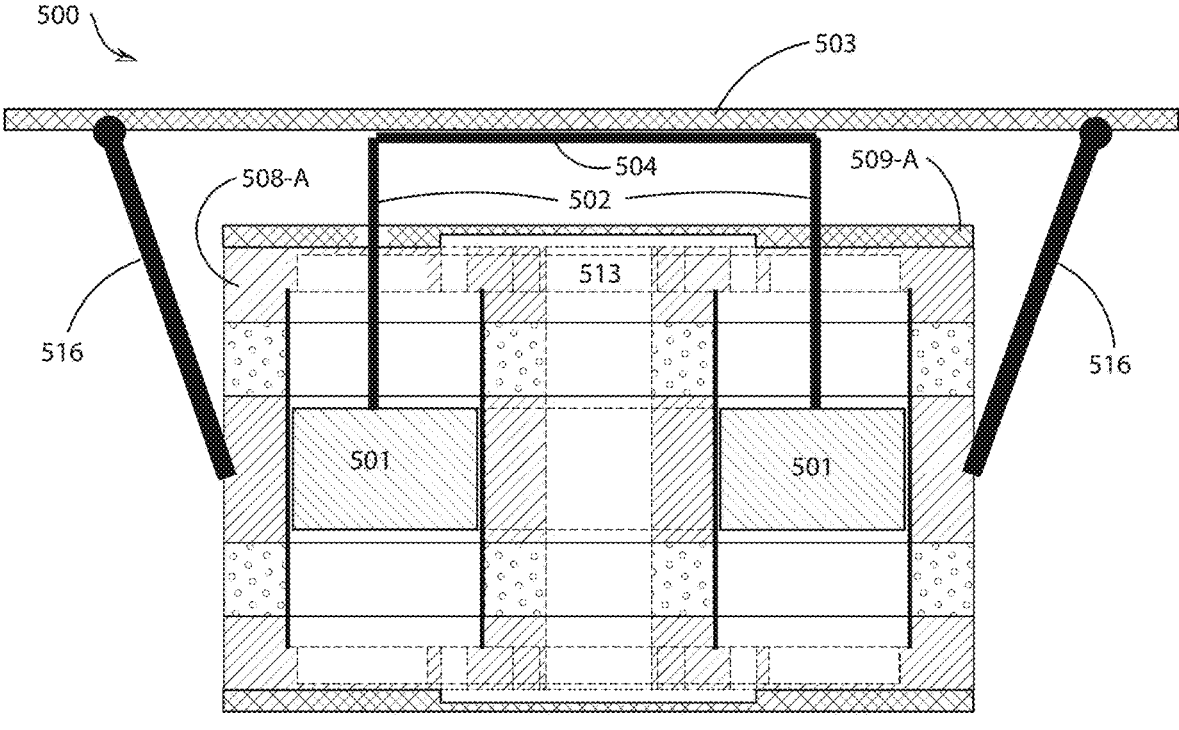
FIG. 9 shows a transducer configuration whereby the reciprocating magnet suspension is on the outside of the transducer and may be formed of an elastic flexure.

FIG. 9 illustrates transducer configuration 500 wherein the reciprocating magnet 501 may be suspended in the null position by an elastic flexure 503, external to the transducer. External supporting structure 516, extends concentrically around the edge of the transducers outer surface and provides an anchored pivot point for the elastic flexure 503. The elastic flexure 503 may be mechanically connected to the reciprocating magnet 501 via a mechanical beam construction. The mechanical beam construction may include two or more vertical beams extending perpendicularly from and joined to the face(s) of the reciprocating magnet 501. The upper surface of reciprocating ring magnet 501 may be joined by beams 502, which extend through the upper connecting surface 508-A and the upper recessed disc 509-A. The vertical beams protrude a distance that may be in excess of half the maximum axial displacement distance of the reciprocating magnet 501, to allow for full axial travel of the reciprocating magnet 501. The vertical beams are joined at their end by a horizontal beam 504. The horizontal beam 504 may be anchored to the elastic flexure 503 so that the flexure exerts a restoring force onto the reciprocating magnet 501 toward the null position.

As can be appreciated, the elastic flexure suspension may be mirrored on the lower and opposite side of the transducer as illustrated in previous figures.

Figure 10:
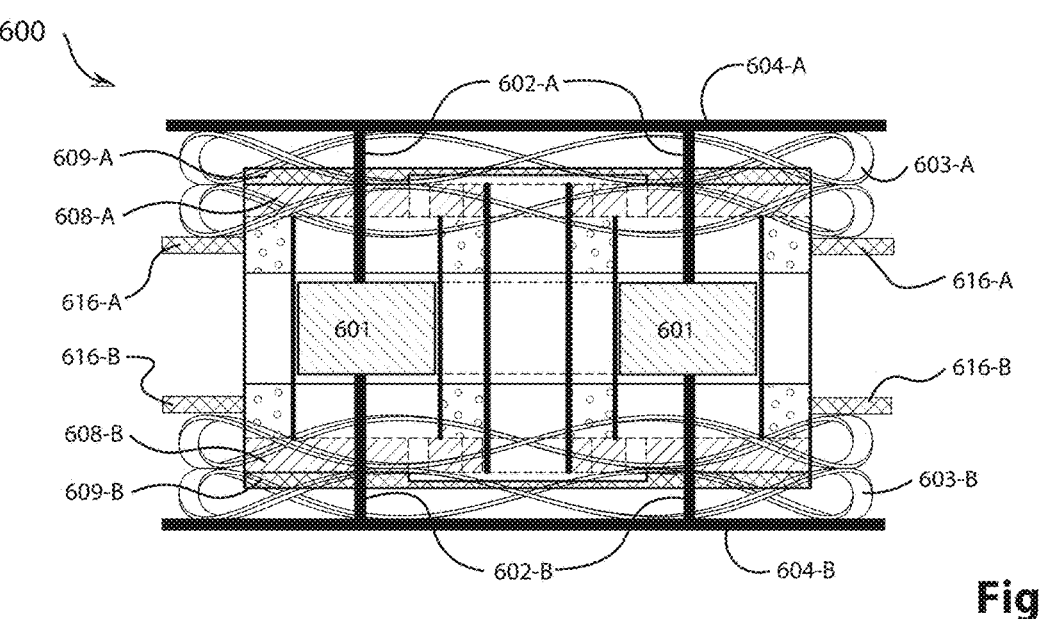
FIG. 10 shows a transducer configuration whereby the suspension is external, and may be formed of springs that surround the transducer perimeter.

FIG. 10 illustrates transducer configuration 600 wherein the reciprocating magnet 601 is suspended in the null position by a spring-suspension system external to the transducer. The suspension system may be comprised of upper 603-A and lower 603-B wave springs which surround the outer edge of the transducer 600. One side of both the upper and lower wave springs 603-A/B compresses against a static surface, illustrated by upper concentric protrusions 616-A and lower concentric protrusions 616-B. The wave springs 603-A/B are mechanically connected to the reciprocating magnet 601 via a mechanical beam construction. In the mechanical beam construction, two or more vertical beams may extend perpendicularly from and be joined to the upper and/or lower face of the reciprocating magnet 601. An upper face of the magnet 601 may be joined by beams 602-A and a lower face may be joined by beams 602-B. The upper beams 602-A may extend through the upper 608-A connecting surface and the upper recessed disc 609-A and the lower beams 602-B may extend through the lower 608-B connecting surface and the lower recessed disc 609-B.

Both the upper and lower vertical beams 602-A/B protrude a distance that may be in excess of half the maximum axial displacement distance of the reciprocating magnet 601, where the at least half the maximum axial displacement distance allows for full axial displacement of reciprocating magnet 601.

The upper vertical beams may be connected at their end to an upper horizontal beam 604-A and the lower vertical beams may be connected at their end to a lower horizontal beam 604-B. The upper and lower horizontal beam may 604-A/B extend horizontally beyond the outer perimeter of the transducer and thereby may form the opposite compression surface for the upper and lower wave springs 602-A/B respectively.

Figure 11A:
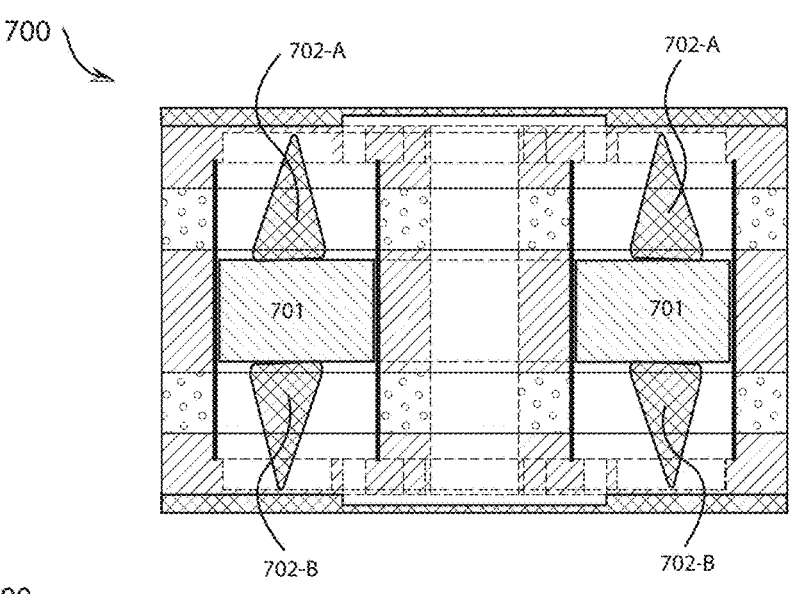
FIGS. 11a and 11b show a transducer configuration in two different states of operation, whereby suspension of the reciprocating magnet is achieved using foam rubber springs.
Figure 11B:
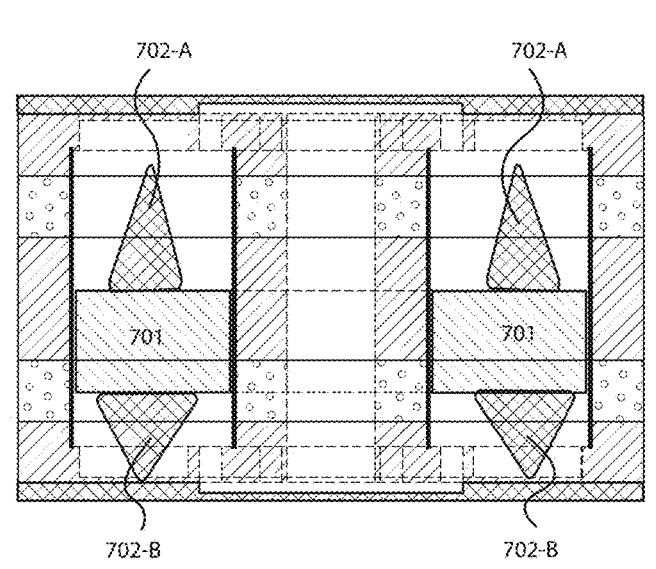

FIG. 11a and FIG. 11b illustrate transducer configuration 700 wherein FIG. 11a represents configuration 700 in a de-energised state whereby the reciprocating magnet 701 is suspended at the null position, whereas FIG. 11b represents configuration 700 in an energised state where the reciprocating magnet 701 is influenced to one extreme of its travel along the axis of reciprocation. The reciprocating magnet 701 of configuration 700 is suspended in the null position by foam rubber springs 702-A and 702-B whereby rubber spring 702-A may be anchored to the upper face of the reciprocating magnet 701 and rubber spring 702-B may be anchored to the lower face of reciprocating magnet 701. Or rubber springs 702-A may be anchored to upper connecting surface 708-A and rubber spring 702-B anchored to lower connecting surface 708-B.

The force-versus-compression characteristics of the foam rubber springs are important so that the transducer has high performance low frequency operation. This means that the compression force should increase non-linearly with compression displacement. This may be accomplished by shaping the foam rubber spring in a triangular cross-section form. It may also be accomplished where the foam rubber has a density gradient. This allows for the foam rubber springs to exhibit minimal resistance to movement of reciprocating magnet 701 around the null position, but with increasing resistance for increased displacement of 701 from the null position.

Figure 12:
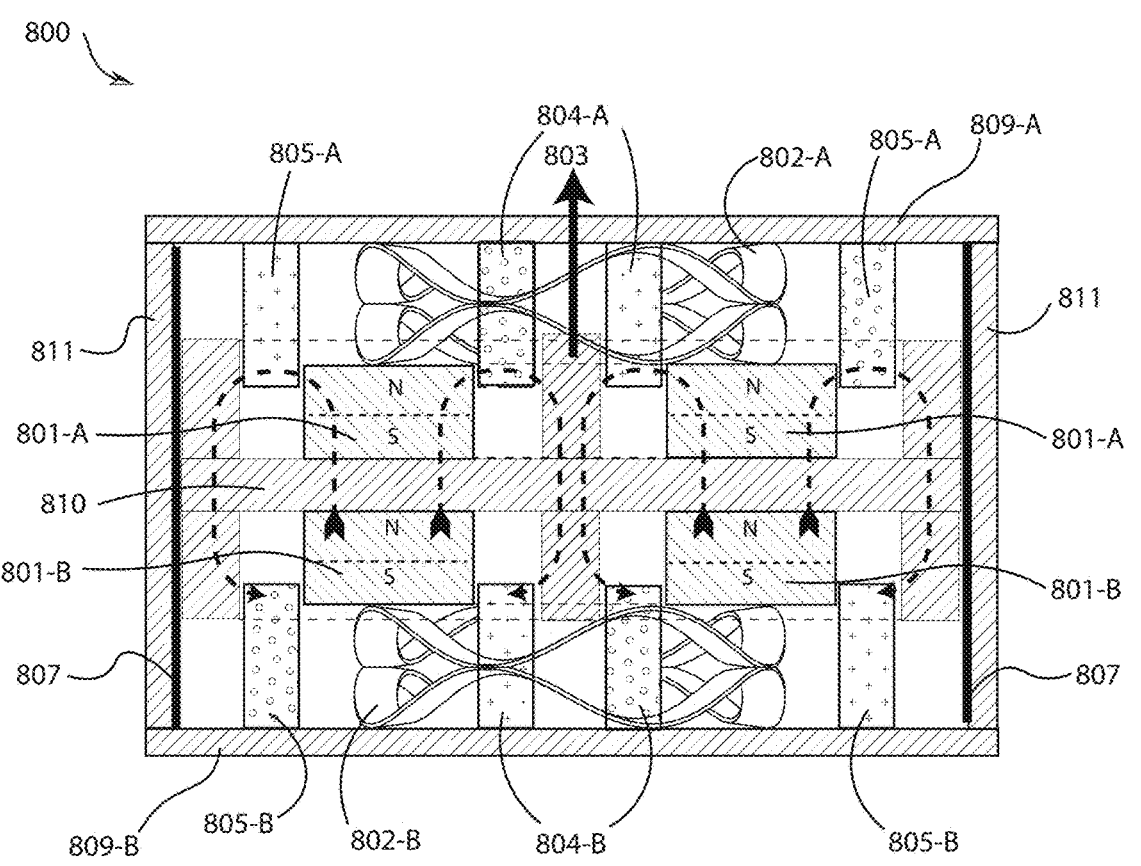
FIG. 12 shows a transducer where the field of the reciprocating magnet is focused by a magnetic yoke.

FIG. 12 illustrates transducer configuration 800 which operates in the same manner as configuration 100 FIG. 1, wherein an axially-magnetised reciprocating magnetic assembly is mechanically suspended between first and second spring members 802-A, 802-B, located on opposing sides of the reciprocating magnetic assembly. The springs 802-A, 802-B are chosen such that they maintain the reciprocating magnetic assembly in the mid-point of its axial travel, whereby the reciprocating magnetic assembly rests at an equilibrium position (i.e. is suspended) between the two springs 802-A, 802-B.

The axially-magnetised reciprocating magnetic assembly is magnetically influenced to move about the null position by at least two pairs of concentrically positioned electromagnetic solenoids 804-A, 805-A and 804-B, 805-B. The two pairs may be referred to as an upper pair and a lower pair, where both solenoids of a particular pair are positioned on the same side of the reciprocating magnetic assembly 801.

Replacing the single axially-magnetised ring magnet, as shown in transducer configuration 100 of FIG. 1, the reciprocating magnetic assembly of configuration 800 of FIG. 12 may be formed of an axial stack of several elements. The axial stack may comprise of two axially-magnetised permanent ring magnets 801-A and 801-B, which are mounted above and below a magnetic yoke 810, whereby the yoke is located in-between the two permanent ring magnets. The magnetic yoke serves to focus the magnetic field of the permanent ring magnet(s) across the upper and lower solenoid-pairs, which increases the electromagnetic coupling between the permanent magnet(s) and the electromagnetic solenoids. The magnetic circuit is illustrated by the dashed line in FIG. 12. The magnetic yoke may be made of a ferromagnetic material. The magnetic yoke 810 may also form part of a linear bearing support for the reciprocating magnetic assembly, wherein the outer edge of the magnetic yoke 810, may slide as a linear bearing along the inner surface of an outer wall 811. The inner surface of the outer wall 811 may be lined with a low-friction material 807. The upper end of the outer wall 811 is joined by upper connecting surface 809-A and the lower end of the outer wall is joined by the lower connecting surface 809-B.

In the configuration shown in FIG. 12, if the electromagnetic solenoids are energised, where the current flows in the direction shown in the pattern on solenoids 804-A, 805-A and 804-B, 805-B, where plus pattern (+) is current flow into the page, and dot pattern (.) signifies current flow out of the page. The reciprocating magnetic assembly, with the axial stack of elements arranged such that the axially-magnetised permanent ring magnets pole direction of the 801-A and 801-B are in the same direction and in the orientation as shown. The reciprocating magnetic assembly will experience a force in the upward direction of arrow 803. If the current direction for all solenoids is reversed, the force on the reciprocating magnetic assembly will be in the opposite direction.

Whereas the examples described with reference to FIGS. 1 to 12 include mechanical support or suspension to position the reciprocating magnet in the null position, the examples described below with reference to FIGS. 13 to 17, magnetically suspend the reciprocating magnet in the null position.

Figures 13, 14, 15:
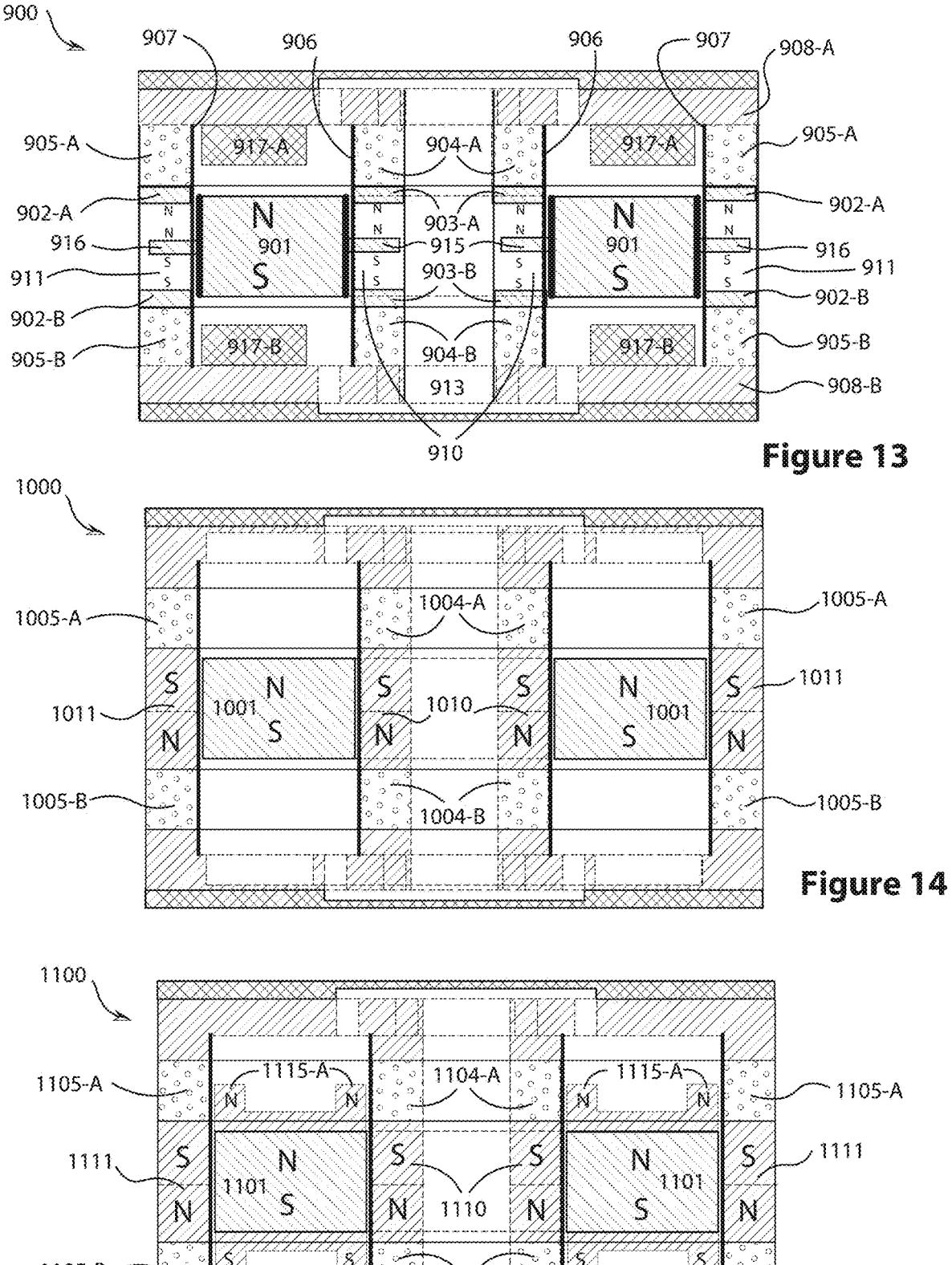
FIG. 13 shows a transducer where the reciprocating magnet is suspended using magnetic-suspension.
FIG. 14 shows a simplification of the reciprocating magnet suspension system of the transducer shown in FIG. 13.
FIG. 15 shows a transducer configuration which has an adaption of the reciprocating magnet of the transducer shown in FIG. 14.

FIG. 13 illustrates configuration 900 wherein reciprocating magnet 901 is suspended in the null position of axial travel, using magnetic suspension in place of mechanical springs. The configuration 900 is similar to that of FIG. 4 but with the spring suspension now replaced with magnetic suspension.

The magnetic suspension of configuration 900 may be located within the vertical and concentric space that separates the upper central 904-A and upper outer 905-A electromagnetic solenoids from the lower central 904-B and lower outer 905-B electromagnetic solenoids. The configuration includes a central space is 910 and outer space 911 in locations corresponding to the locations of the central and outer spacers 110, 111 of FIG. 1. One or more permanent ring magnets may be attached on the lower face of the upper central 904-A and upper outer 905-A electromagnetic solenoids. In the specific example of FIG. 13, there is an upper outer suspension ring magnet 902-A coupled to the lower end of the upper outer solenoid and upper central suspension ring magnet 903-A coupled to the lower end of the upper central solenoid. The magnetic pole direction of suspension magnets 902-A and 903-A may be, but not necessarily, in the opposite direction to the magnetic pole direction of the reciprocating magnet 901. Forming the opposite side to the magnetic suspension, and located on the upper face of the lower central 904-B and lower outer 905-B electromagnetic solenoids, one or more permanent magnet rings are attached. These are illustrated by lower outer suspension ring magnet 902-B and lower central suspension ring magnet 903-B, wherein their magnetic pole direction opposed that of their upper counterparts 902-A and 903-A.

Suspension of the reciprocating magnet 901 within the magnetic spring may be achieved by mechanically attaching the reciprocating magnet 901 to a central suspension ring magnet 915 and outer suspension ring magnet 916. The central and outer suspension ring magnet may be magnetically suspended in the null position by the magnetic repulsive force exerted by the central 903-A/B and outer 902-A/B magnetic suspension pairs, if the magnetic pole direction of the central 915 and outer 916 suspension ring magnet is suitably chosen. The reciprocating magnet 901 may be mechanically connected to the central suspension ring magnet 915 and the outer suspension ring magnet 916 via radial arms which pass through slots in the respective outer static surface 907 and inner static surface 906.

The extent of vertical travel of the reciprocating magnet 901 should be limited such that the radial arms extending from 901 do not impact with the end travel of the vertical slots of the inner 906 and outer 907 static surfaces, or to avoid the moving element of the magnetic suspension from impacting the static one. This may be accomplished using a shock absorbent material that limits the vertical travel of the reciprocating magnet 901, and which may be located on the upper static connecting surface 908-A and lower static connecting surface 908-B, illustrated by 917-A and 917-B, or may be located on the upper and lower face of the reciprocating magnet 901.

FIG. 14 illustrates transducer configuration 1000 wherein reciprocating magnet 1001 is suspended in the null position of travel using magnetic suspension. The magnetic suspension of configuration 1000 is a simplification of that shown in FIG. 13. Wherein the magnetic suspension of configuration 1000 may be located within the vertical and concentric space that separates the upper central 1004-A and upper outer 1005-A electromagnetic solenoids from the lower central 1004-B and lower outer 1005-B electromagnetic solenoids. If the central vertical concentric space 1010 and outer concentric vertical space 1011 are chosen to contain axially-magnetised permanent ring magnets, with both the central and outer ring magnet's magnetic poles chosen to be opposite to that of the direction of the reciprocating magnet 1001, then there will be a restoring force that will influence the reciprocating magnet 1001 to return to the null position if influenced to deviate from it by the electromagnetic solenoids.

FIG. 15 illustrates configuration 1100, which is a development of configuration 1000 shown in FIG. 14 wherein the reciprocating magnet 1101 may have extended pole pieces attached to the axial poles of the magnet. An upper pole piece 1115-A may be attached to the upper surface of reciprocating magnet 1101 and lower pole piece 1115-B may be attached to the lower surface. The pole pieces 1115-A/B serve to extend the flux length of the reciprocating magnet, and to focus the magnetic flux of the magnet toward the central electromagnetic solenoids 1104-A/B and outer electromagnetic solenoids 1105-A/B. A cross-sectional shape of pole piece 1115-A/B t may be U shaped. Alternatively, the pole piece may have a rectangular cross-section. The U-shaped cross-section allows for a reduction in mass, whilst maintaining its magnetic function. Although not illustrated, the U-shaped cross-section allows for a shock-absorbing material to be inserted into the recess of the pole-piece, to allow for damped impact of the reciprocating element when it reaches the end of its travel.

Additionally, the pole pieces are attracted to the suspension magnet, when the reciprocating magnet 1101 reaches the end of its travel, serving to arrest motion at the end of travel. The pole pieces 1115-A/B also provide extra mass to the reciprocating element, increasing the force which can be generated from a fixed acceleration.

The pole pieces 1115-A/B may be held in place against the faces of reciprocating magnet 1101 by magnetic force, or by gluing them. The material chosen for the pole-piece may be a ferromagnetic material, allowing the magnetic flux to be influenced by their shape.

Figure 16A:
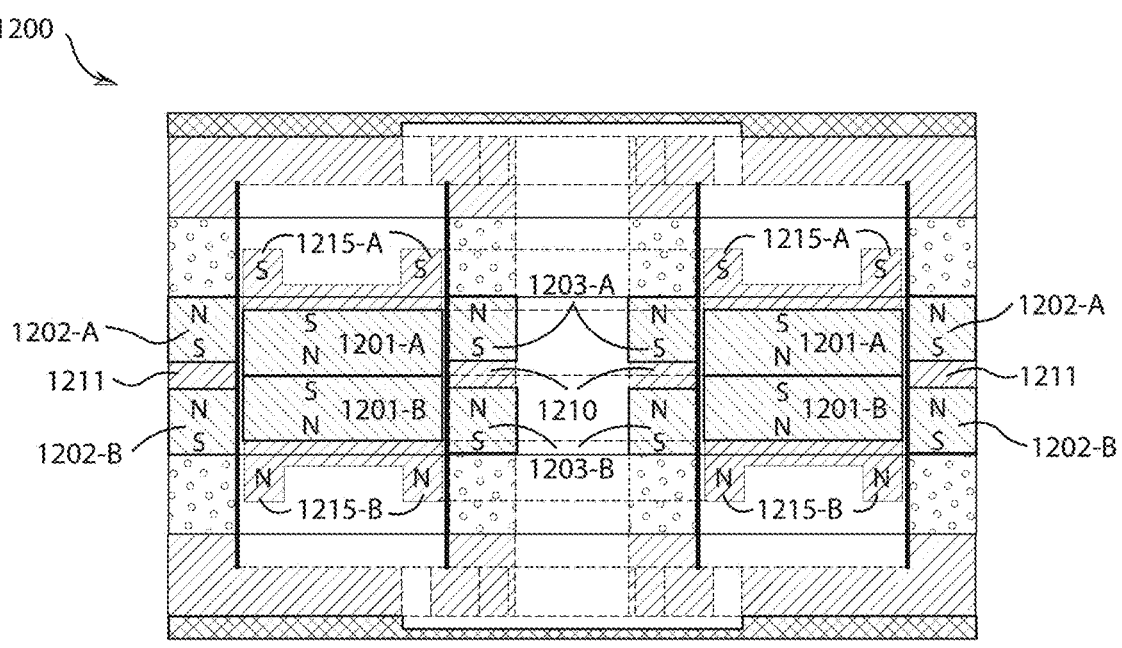
FIGS. 16a and 16b show a transducer with a configuration adaption over the transducer shown in FIG. 15, wherein the reciprocating magnet may be formed of more than one magnet.
Figure 16B:
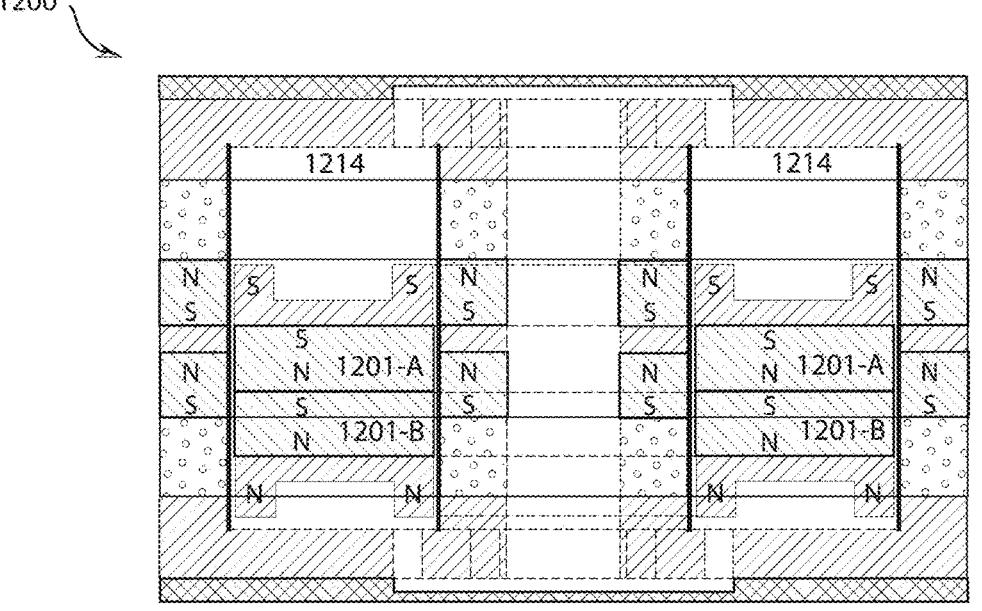

FIG. 16a and FIG. 16b illustrate transducer configuration 1200 in two different states, wherein FIG. 16a illustrates the transducer in a de-energised state, whereas FIG. 16b illustrates an energised transducer.

Configuration 1200 is a development to the transducer configuration shown in FIG. 15, whereby magnetic suspension of the reciprocating magnet assembly is suspended in the null position via permanent magnets embedded in the central and outer concentric walls, which provide a restoring force influence on the reciprocating magnet assembly.

Whereas in FIG. 14 and FIG. 15 the central and outer concentric suspension magnet is shown as a single magnetic flux producing element, in configuration 1200 both the central and outer suspension ring magnets may be comprised of two separate flux producing permanent magnets, with the central suspension ring magnets 1203-A/B separated by a central spacer 1210 and the outer suspension ring magnets 1202-A/B separated by outer spacer 1211. The spacer may be of a material which is ferromagnetic.

The reciprocating magnet assembly may be comprised of two axially-magnetised ring magnets, with similar magnetic pole direction, attached face-to-face, illustrated by the upper half ring magnet 1201-A and lower half ring magnet 1201-B. To both the upper face and lower face of the reciprocating ring magnet assembly, ferromagnetic pole pieces, upper 1215-A and lower 1215-B, may be added to extend the magnetic flux path length of the reciprocating magnet assembly and increase mass, as explained in FIG. 15.

Figure 17:
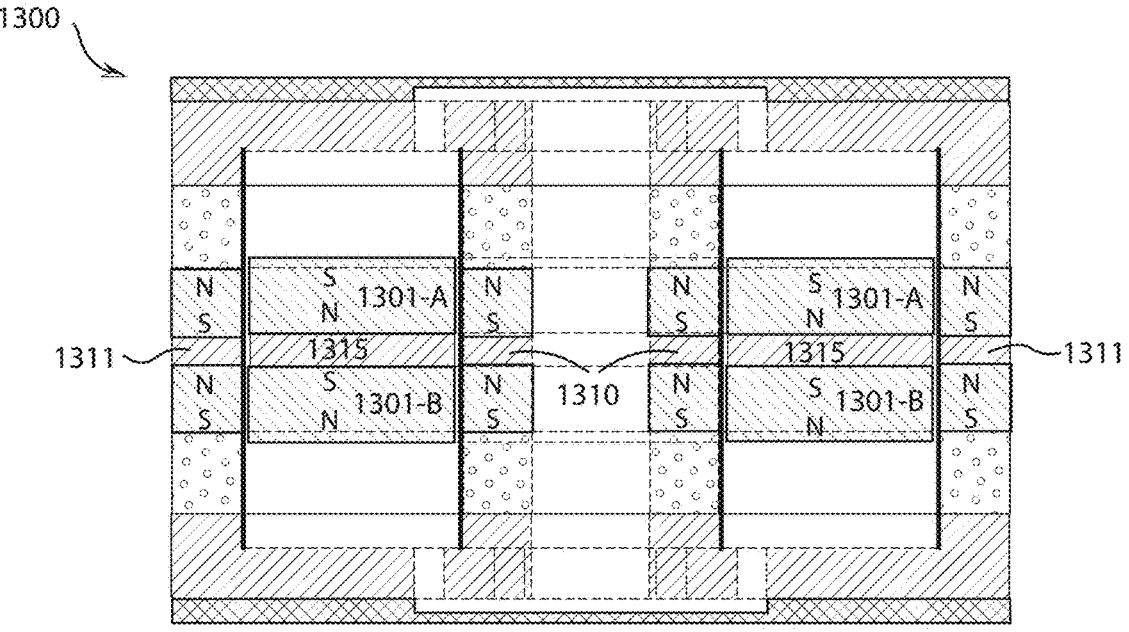
FIG. 17 shows a transducer that is an adaption of the transducer illustrated in FIG. 16 but with a different configuration of the reciprocating magnet assembly.

FIG. 17 illustrates transducer configuration 1300, which is a variation of the transducer configuration shown in FIG. 16. The variation concerns the reciprocating magnet assembly, whereby here it is comprised of a stack of two axially-magnetised ring magnets with similar magnetic pole direction, illustrated by the upper half ring magnet 1301-A and lower half ring magnet 1301-B, which here, are separated by a ring spacer 1315. The ring spacer may be made of a ferromagnetic material. It may be of a similar thickness to the central spacer 1310 and outer spacer 1311.

Figures 18A, 18B:
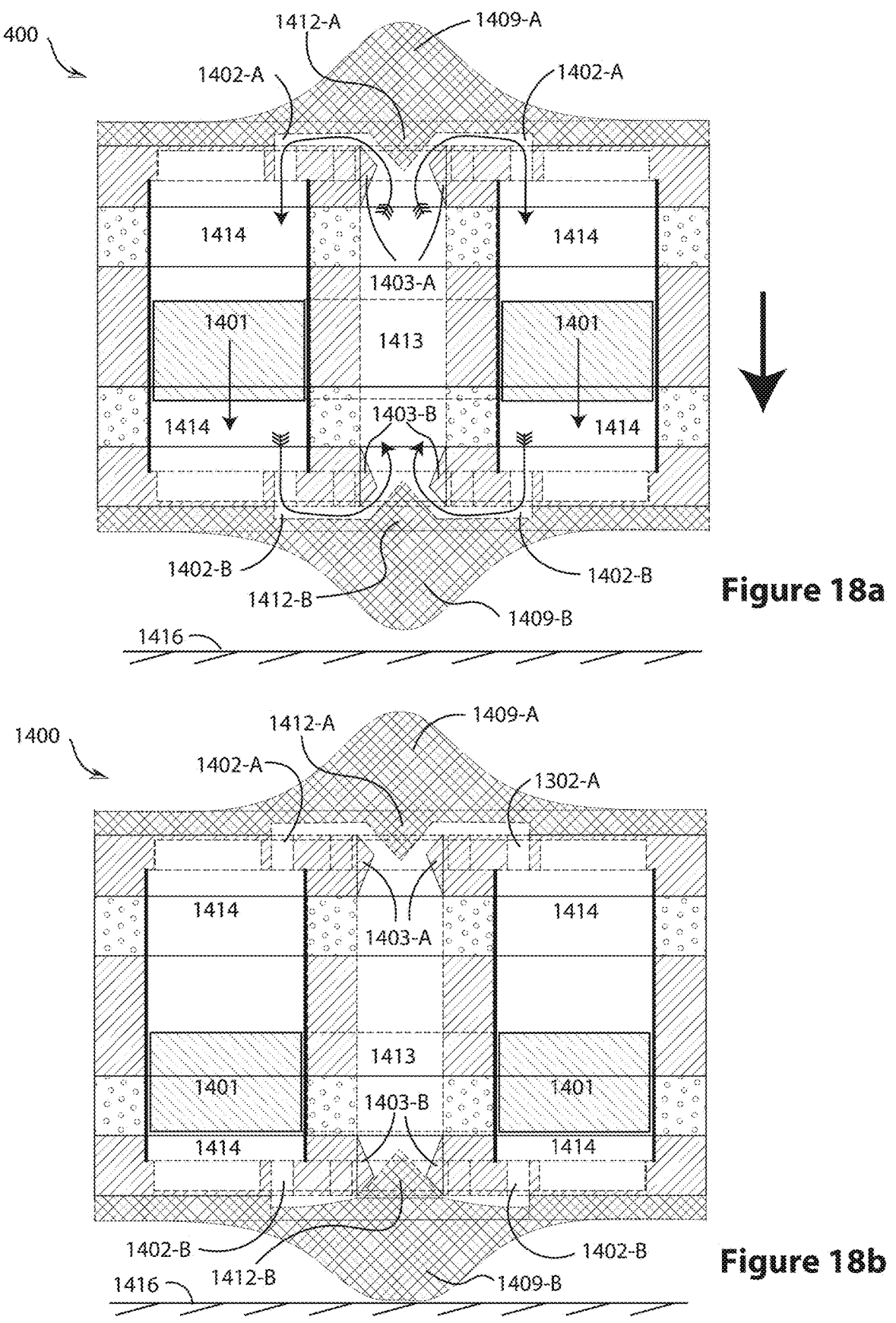
FIGS. 18a and 18b show a simplified illustration of the transducer of FIG. 1, with focus on the adaption of the fluid pathway, with the aim to reduce the impact force exerted onto the reciprocating magnet in the event of an external impact.

FIG. 18a and FIG. 18b illustrate transducer configuration 1400 which operates as a transducer in the same manner as described in relation to configuration 100 of FIG. 1, but is shown without a suspension mechanism so focus can be made to the dynamic operation of the transducer and how it may be modified to reduce the potential for catastrophic damage to the reciprocating magnet 1401 in the event that the transducer itself is subject to a hard impact force along the axis of reciprocation. FIG. 18a illustrates transducer 1400 in normal operation, whereas FIG. 18b illustrates transducer configuration 1400 in a condition where it has been impacted against a hard surface 1416.

Under normal operation of configuration 1400, the displacement of fluid within the volume 1414 caused by the axial displacement of the reciprocating magnet 1401, is equalised between the upper and lower volume halves, using a fluidic circuit allowing the fluid to flow in either direction through one or more orifices 1402-A, routed by recessed disc 1412-A through to the central fluid channel 1413 where the fluid is routed by recessed disc 1412-B to one or more orifices 1402-B. If the flow, caused by the displacement of the reciprocating magnet 1401 were to be inhibited by a valve, the movement of the reciprocating magnet will be limited to the amount it can compress the fluid, and will cease normal low-frequency operation. In normal circumstances this would not be advantageous, however in an application where the transducer itself may be subject to impact forces against a hard surface, mitigation to protect the reciprocating magnet from high impact force is desirable. One application may be in haptic footwear, where the wearer is expected to walk on a sole, with integrated haptic transducers, which are subject to the force of walking. Additionally it is not desirable for the impact of walking to create an impulse that will set the transducer into self-oscillation. Having control of the equalisation flow within the transducer, allows control of the position and dynamics of the movement of reciprocating magnet 1401, and therefore can solve the problems associated with high external impact force of the transducer, without having to use electromechanical influence to actively maintain the position and response of the reciprocating magnet 1401. To achieve this, a mechanical valve which is dependent on the amount it has been compressed is proposed. By simple modification of the shape of the transducer, a valve with the desired performance can be achieved. Configuration 1400, unlike configuration 100, features a recessed disc 1409-A/B with a complex geometry. The outer shape is designed such that an increased compression displacement results in a non-linear closing of the valve. This allows for light impacts to have minimal effect on the transducer operation, whereas a hard impact will severely inhibit the movement of the reciprocating magnet, until the force compressing the valve released. The material chosen for the valve may be chosen for exhibiting a hysteresis 'sticky' response, to allow a delay before the valve re-opens after an impact event. The valve itself may be constructed by having a conical protrusion 1412-A/B integrated into recessed disc 1409-A/B and by shaping the entrance to the central fluid channel 1413 with a conical countersink 1403-A/B that matches said protrusion 1412-A/B. Where the external shape of the recessed disc 1409-A/B is uncompressed, a gap between the conical protrusion 1412-A/B and conical countersink 1403-A/B is maintained allowing for uninhibited dynamic operation of the transducer. When the external shape of the recessed disc 1409-A/B is compressed, the gap between the conical protrusion 1412-A/B and conical countersink 1403-A/B is reduced, inhibiting the equalisation flow and reducing the ability for the reciprocating magnet 1401 to move.

FIGS. 19 to 24 illustrate various transducer configurations. In FIGS. 19 to 24, the transducers are represented as vertical cross-sections. The transducers, similarly to other transducer configurations described herein, may be generally cylindrical. However, the shape of the transducers may be dependent on the shape of the reciprocating magnet, such that, if the magnet is annular, the transducer may have a cylindrical shape but, if the magnet has for instance a square or rectangular perimeter, the transducer may be generally cuboidal.

Figure 19:
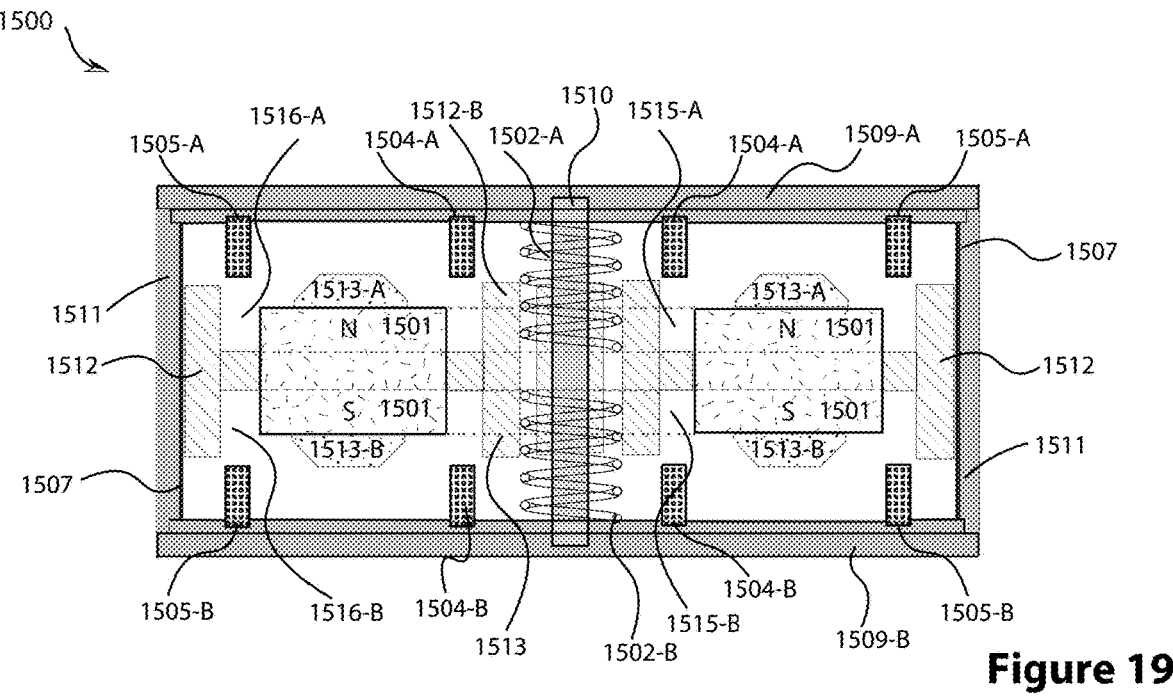
FIGS. 19 to 24 illustrate various different transducer configurations.

The transducer 1500 of FIG. 19 may be similar to some of the other transducers described herein in that it comprises an axially-magnetised reciprocating magnet 1501 mechanically suspended in a plane that is between a first pair 1504-A, 1505-A of at least two pairs of concentrically positioned electromagnetic solenoids and a second pair 1504-B, 1505-B of the at least two pairs of concentrically positioned electromagnetic solenoids between first and second spring members 102-A, 102-B.

However, in the transducer configuration 1500 of FIG. 19, the central guide member is formed of a central pin 1510. The central pin 1510 may be made of a ridged material, for example metal. The central pin 1510 may have a low surface roughness.

Located around this central pin 1510 is a central sliding member 1513. Central sliding member 1513 may be made of ferromagnetic material. It may also have a non-ferromagnetic, low-friction material located on the inner axial surface of sliding member 1513 which contacts the central guide pin 1510. The low-friction material may form a linear bearing between sliding member 1513 and central guide pin 1510. The outer axial surface of central sliding member may be attached to inner aperture of reciprocating magnet 1501. The attachment location of the outer axial surface of central sliding member and the inner aperture of reciprocating magnet 1501 may be at the mid-plane axis of the reciprocating magnet 1501, between the upper boundary and lower boundary of reciprocating magnet 1501, orthogonal to the central guide pin 1510 axis.

The central sliding member 1513 may have a cross-sectional shape such that it forms a yoke for the inner aperture of reciprocating magnet 1501. The yoke may serve to guide and focus the magnetic field lines of the inner aperture of reciprocating magnet 1501 across an inner air-gap shown as 1515-A on the upper boundary and 1515-B on the lower boundary.

The central sliding member 1513 may have bores formed in the upper 1516-A and lower 1516-B axial faces which may serve to locate at least one spring. Shown in the illustration as two springs; upper spring 1502-A and lower spring 1502-B. Such spring(s) may be a coil spring, wave spring, or a material exhibiting an elastic property. The spring(s) may be either in compression or extension form.

The central sliding member 1513 and the reciprocating magnet 1501 and its subcomponents, may form a single moving structure, which is suspended by the spring(s).

In order to focus the magnetic field of the outer boundary of reciprocating magnet 1501, an outer sliding member yoke 1512 may be employed. Outer sliding member yoke 1512 may have a T-shaped cross-section. The base of the T may be mechanically connected to the outer boundary of reciprocating magnet 1501. The attachment location between the outer sliding member yoke 1512 and the outer boundary of reciprocating magnet 1501 may be at the mid-plane axis of the reciprocating magnet 1501, between the upper boundary and lower boundary of reciprocating magnet 1501, orthogonal to the central guide pin 1510 axis. The outer surface of outer sliding member yoke 1512, formed as the top of the T-shaped cross-section, forms an outer sliding surface. The outer sliding surface of outer sliding member yoke 1512 may slide against an inner face of the outer guide member 1511. Either the outer sliding surface of outer sliding member yoke 1512 or the inner face of the outer guide member 1511 may feature a layer of low friction material 1507. This may serve to allow free movement and linear guidance between the outer sliding member yoke 1512 and outer guide member 1511.

The central sliding member yoke 1513 and outer sliding member yoke 1512 may be made of a ferromagnetic material such as iron, nickel or cobalt.

The outer guide member 1511 may have an upper 1509-A and lower 1509-B connecting surface, which forms a lid on both open sides of outer guide member 1511.

The inner surface of the upper connecting surface 1509-A may feature a recess that locates the central pin 1510 and may be central to the outer support 1511. The inner surface of the upper connecting surface 1509-A may also serve to provide an upper boundary for upper spring 1502-A.

The inner surface of the upper connecting surface 1509-A may also feature one or more solenoids that may extend a distance outward from the inner surface, such that they influence the reciprocating magnet 1501. The solenoids may be of a width such that the solenoid fits within air-gap(s) created between central and outer yoke 1513 and 1512 respectively and reciprocating magnet 1501.

In the Figure, the upper central solenoid 1504-A is located such that it sits above the air-gap 1515-A formed between the central sliding member 1513 acting as a yoke and reciprocating magnet 1501. The upper outer solenoid 1505-A is located such that it sits above the air-gap 1516-A formed between the outer sliding member yoke 1512 and reciprocating magnet 1501. When the upper central solenoid 1504-A and the upper outer solenoid 1505-A are both energised with the same magnetic polarity, they may both influence the reciprocating magnet 1501 to move, either toward or away from the solenoids magnetic field, depending on the energization polarity.

The opposite configuration of influence of the reciprocating magnet 1501 may be made on the lower connecting surface 1509-B. As such, the inner surface of the lower connecting surface 1509-B may also feature one or more solenoids that may extend a distance outward from the inner surface, such that they influence the reciprocating magnet 1501. The solenoids may be of a width such that the solenoid fits within air-gap(s) created between central and outer yoke 1513 and 1512 respectively and reciprocating magnet 1501.

In the Figure, the lower central solenoid 1504-B is located such that it sits above the air-gap 1515-B formed between the central sliding member 1513 acting as a yoke and reciprocating magnet 1501.

The lower outer solenoid 1505-B is located such that it sits above the air-gap 1516-B formed between the outer sliding member yoke 1512 and reciprocating magnet 1501.

When lower central solenoid 1504-B and lower outer solenoid 1505-B are both energised with the same magnetic polarity, they both influence the reciprocating magnet 1501 to move, either toward or away from the solenoids magnetic field, depending on the energization polarity.

When the upper solenoid(s) 1504-A 1505-A and lower solenoid(s) 1504-B, 1505-B are configured and energized such that they influence reciprocating magnet 1501 in the same direction, the force imparted upon the reciprocating magnet 1501 is greater than it would be with any single solenoid.

Also illustrated in FIG. 19 are shock absorbent elements 1513-A, B located on upper and lower faces of the reciprocating magnet. These serve to dampen any impact between the magnet and the connecting surfaces. As will be appreciated, these may instead be provided on the upper and lower connecting surfaces.

Figure 20:
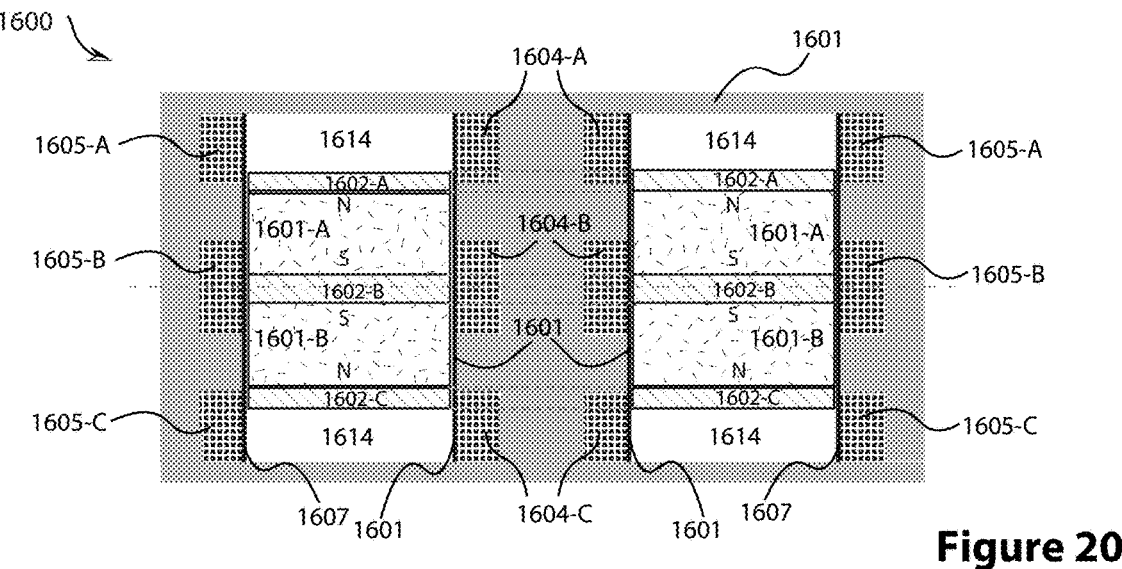

As illustrated in FIG. 20, in some examples, the annular reciprocating magnet may be formed of a compound stack of magnets. However, different to previously described configurations, the stacked magnets may be arranged in a back-to-back configuration such that the magnetic polarity of one magnet faces the other, North to North or South to South. This serves to concentrate the magnetic flux density at the plane of where the poles meet, illustrated in FIG. 21a.

In the configuration 1600, the upper face of the lower half of reciprocating magnet 1601-B may be attached to the lower face of the upper half of reciprocating magnet 1601-A through yoke 1602-B. The yoke may be made of a ferromagnetic material. The yoke may serve to mate the upper 1601-A and lower 1601-B magnetic halves and, in addition, to guide the magnetic field lines. An upper yoke 1602-A may be added to the upper surface of the upper half of reciprocating magnet 1601-A. A lower yoke 1602-C may be added to the lower surface of the lower half of reciprocating magnet 1601-B. Both the upper and lower yokes may serve to guide the magnetic field.

The annular reciprocating magnet stack may be influenced to move by the placement of at least one solenoid to influence either/or the inner and outer boundaries of the reciprocating magnet stack. With the back-to-back configuration of magnets, a central solenoid may be used. The central solenoid may be provided at the null-plane of the annular reciprocating magnet stack. The central solenoid may comprise an inner central solenoid 1604-B and an outer central solenoid 1605-B.

In addition to the central solenoid(s), upper and lower solenoid(s) may be employed to further increase influence upon the annular reciprocating magnet stack. For instance, an upper central solenoid 1604-A and upper outer solenoid 1605-A may be provided to influence the upper half 1601-A and 1602-A of the annular reciprocating magnet stack. Similarly, a lower central solenoid 1604-C and lower outer solenoid 1605-C may be provided to influence the lower half 1601-B and 1602-B of the annular reciprocating magnet stack.

The up to six driving solenoids inner 1604-A/B/C and outer 1605-A/B/C may be configured so that when energized they provide influence to annular reciprocating magnet stack in the same direction. One or more of the solenoids may also be used to provide feedback of the position of the annular reciprocating magnet stack, which may feed into a closed-loop servo system to keep better control of the coherence of the transducers output. One or more of the solenoids may also be used to provide electro-magnetic suspension of the annular reciprocating magnet stack, reducing the need for physical suspension springs or permanent magnet suspension schemes. Alternatively, the reciprocating magnet may be mechanically suspended or supported (e.g. by springs or in any of the other manners described herein).

In some examples, the number of magnetic layers in the reciprocating magnet stack may be increased. In such examples a number of inner and outer solenoids may also be increased to further increase the force that can be imparted upon the annular reciprocating magnet stack.

Figure 21A:
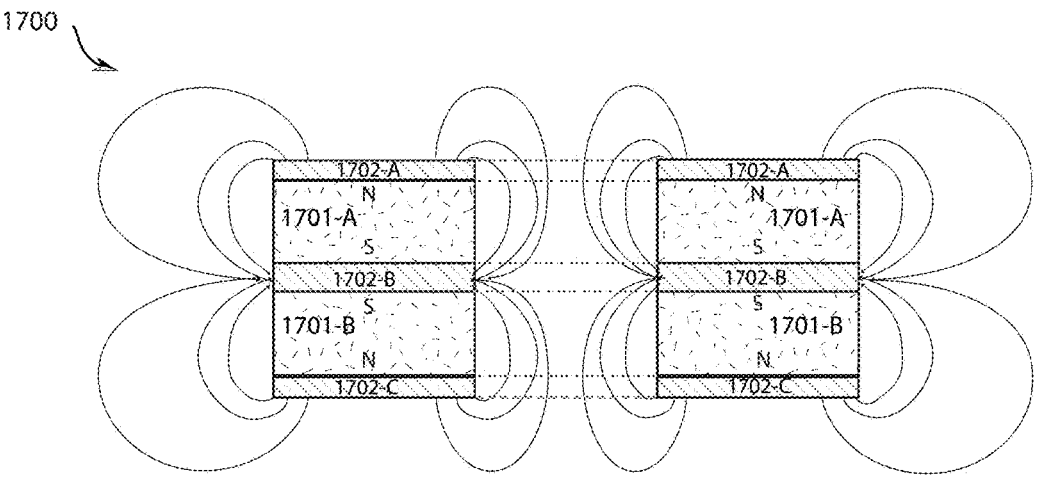
Figure 21B:
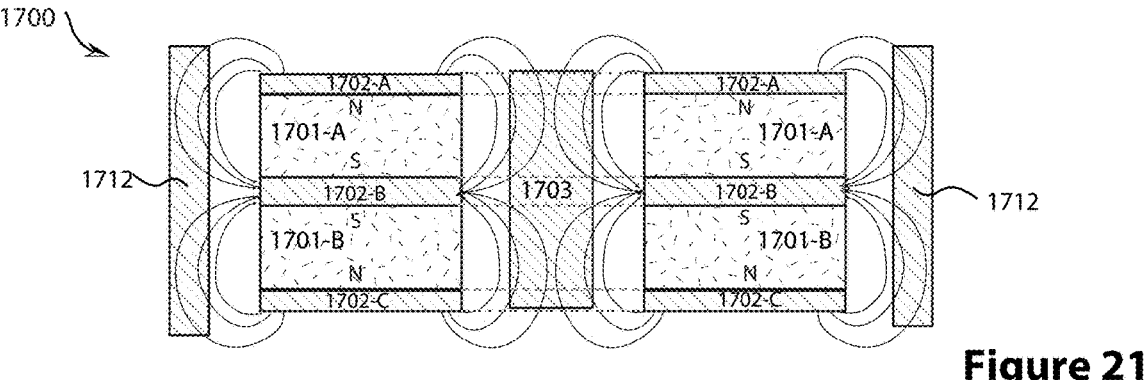
Figure 21C:
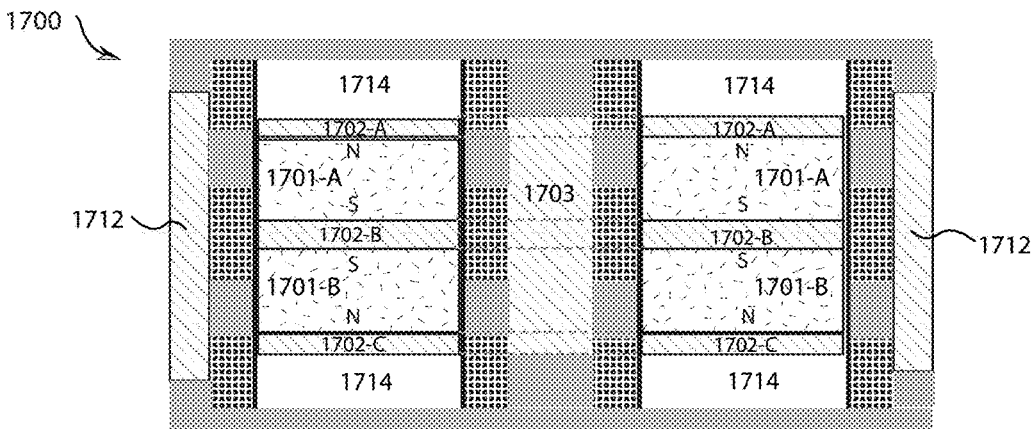

FIG. 21a and FIG. 21b illustrate the stages of design for configuration 1700 FIG. 21c.

Transducer configuration 1700 illustrated in FIG. 21c is a variation of transducer configuration 1600 with an added central yoke 1703 and outer yoke 1712. Such yokes may be made of a ferromagnetic material such as iron, nickel or cobalt.

FIG. 21a illustrates the back-to-back annular reciprocating magnet stack as described for configuration 1600, and the expected magnetic field lines surrounding it. It shows how the configuration serves to concentrate the magnetic flux density at the plane of where the poles meet. FIG. 21b shows the addition of a central yoke 1703 and outer yoke

1712, which serve to contain and focus the magnetic field in the gap between the magnetic stack and the central yoke 1703 and outer yoke 1712. FIG. 21*c* illustrates how the central 1703 and outer 1712 yoke locate within configuration 1700, which has the same form, asides from the yoke(s), as configuration 1600.

Figure 22A:
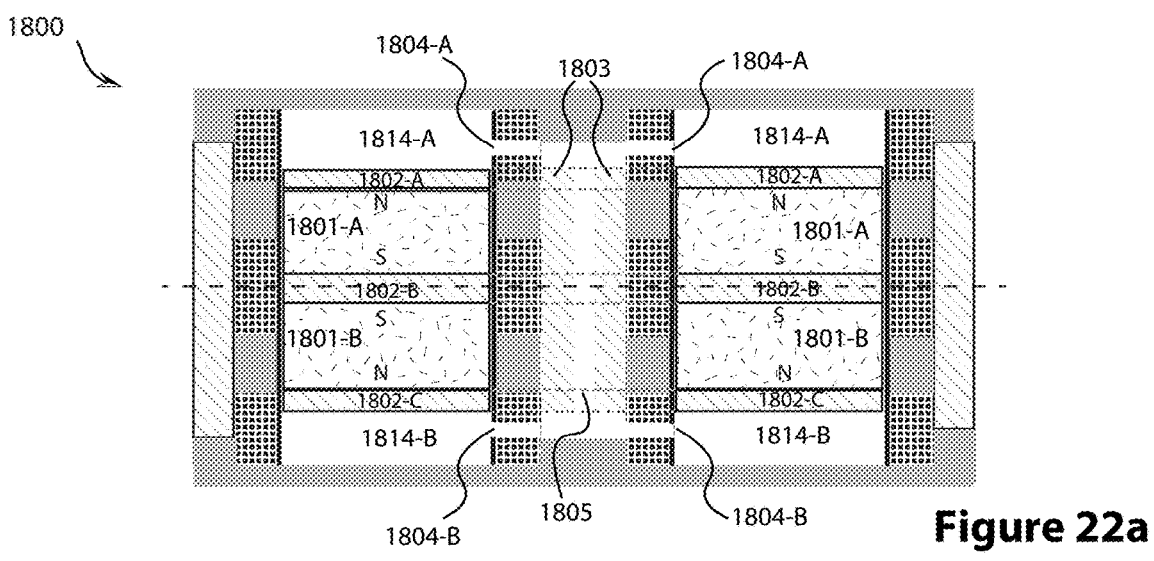
Figure 22B:
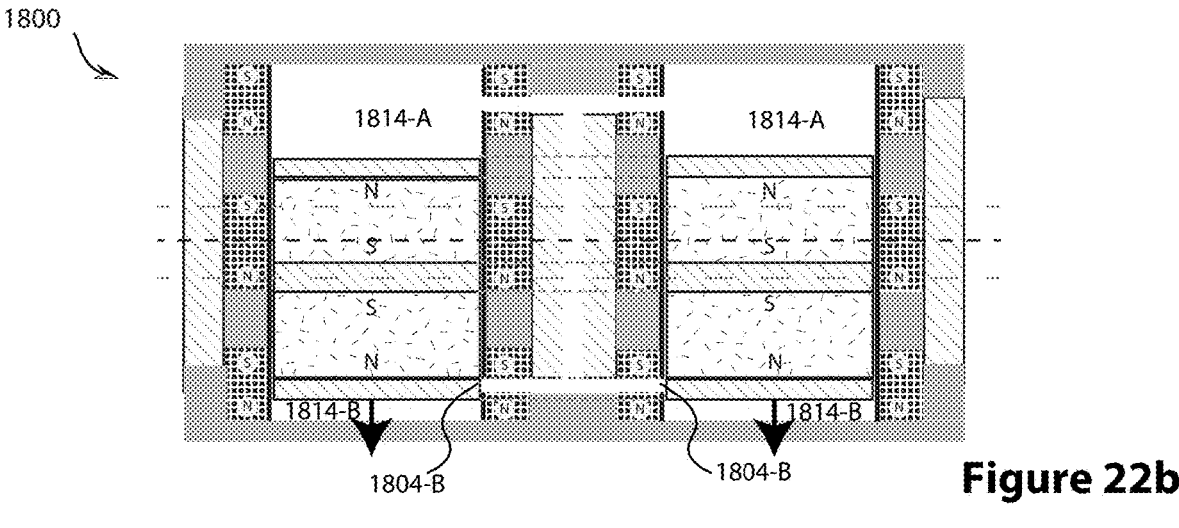
Figure 22C:
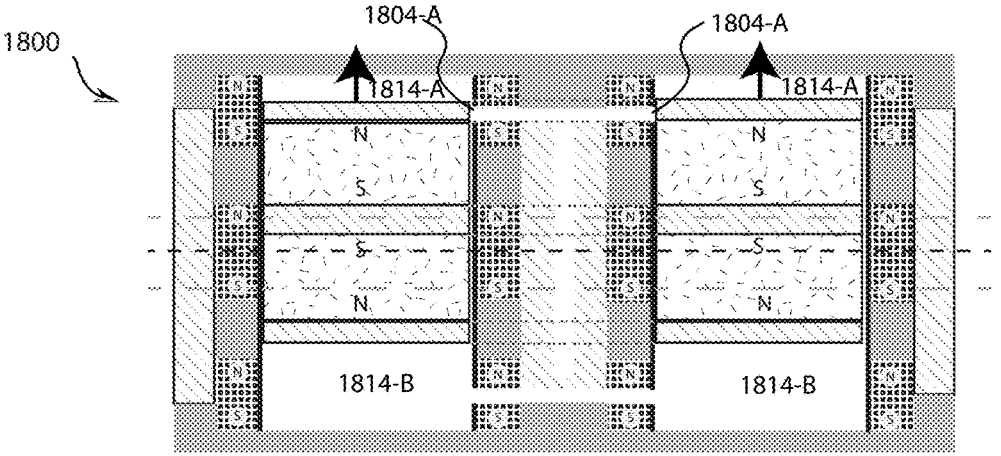

FIG. 22*a*, FIG. 22*b* and FIG. 22*c* illustrate configuration 1800, which is a development of configuration 1700, and which is intended to address the issue of over-travel of the reciprocating element. FIG. 22*a* shows the annular recipro-cating magnet stack, where the upper face of the lower half of reciprocating magnet 1801-B attached to the lower face of the upper half of reciprocating magnet 1801-A through yoke 1802-B which may be made of a ferromagnetic material, and serves to mate the upper 1801-A and lower 1801-B magnetic halves and in addition guides the magnetic field lines. An upper yoke 1802-A may be added to the upper surface of the upper half of reciprocating magnet 1801-A. A lower yoke 1802-C may be added to the lower surface of the lower half of reciprocating magnet 1801-B.

The annular reciprocating magnet stack, reciprocates within volume 1814-A/B. If the volume 1814-A/B is sealed with fluid within it, which may be a gas or liquid, the magnet will be restricted from moving freely along its travel. Therefore, a fluid conduit may be made between the upper volume 1814-A and lower volume 1814-B. Shown as ports 1804-A in the upper half of the central support and ports 1804-B in the lower half of the central support connected by a path 1805 through the centre of yoke 1803.

Figures 23A, 23B, 23C:
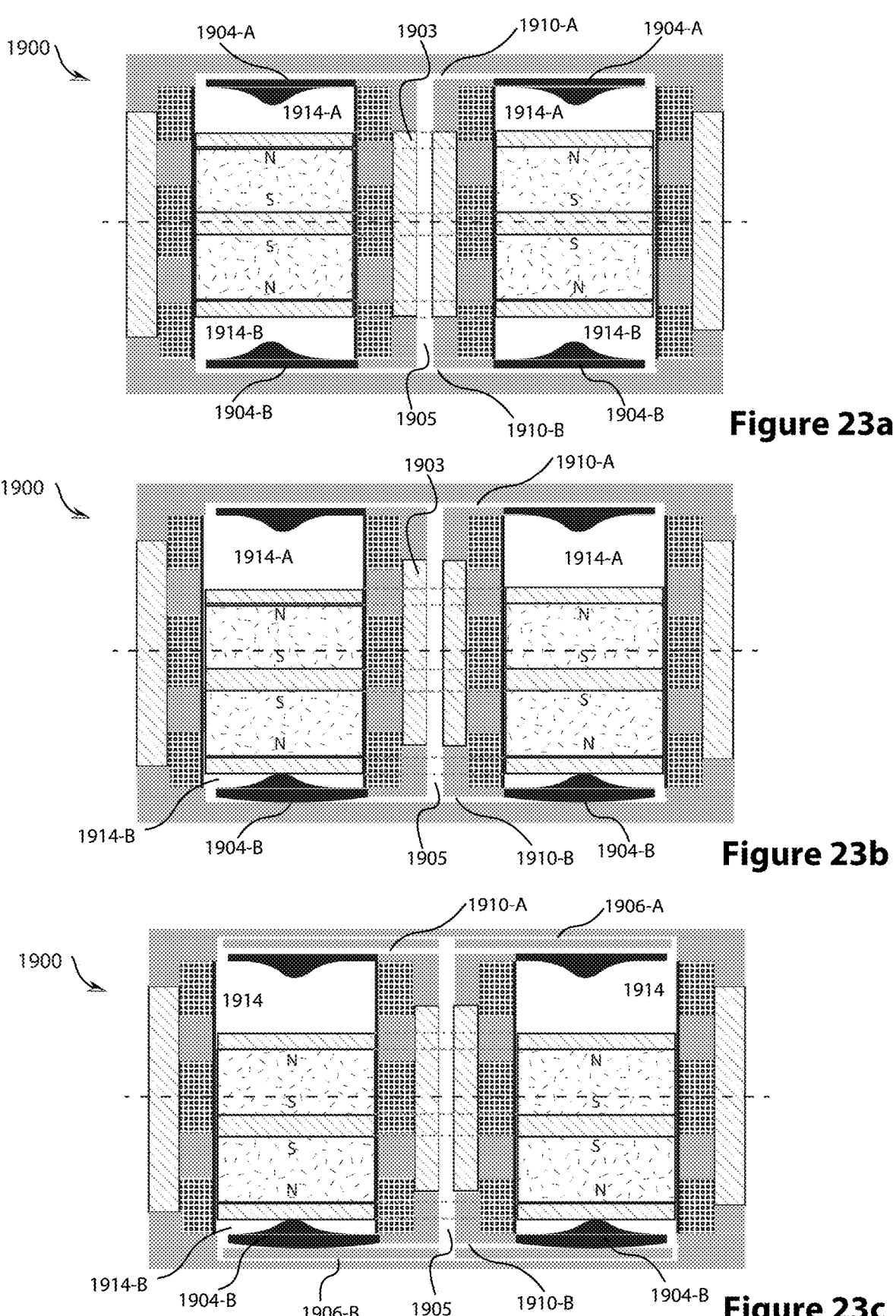

The configuration depicted in FIGS. 22*a* to 22*c* may address the issue, associated with linear actuators, of over-travel. A dampening material such as rubber may be used on surfaces which may collide in an over-travel situation. However, if, as is depicted in FIGS. 22*a* to *c*, the ports 1804-A/B are located such that the linear movement of the magnetic stack closes off the fluid path at the point of over-travel, then the remaining volume of fluid will be subject to compression and serves as a passive end-stop. The reciprocating annular magnet stack is shown in FIG. 22*b* and FIG. 22*c* in its lower and upper over-travel position. FIG. 23*a*, FIG. 23*b* and FIG. 23*c* illustrate configuration 1900, which is a development of configuration 1800, concerning over-travel of the reciprocating element. In this configura-tion, the impact of the annular reciprocating magnet stack upon a flexible valve causes the fluid path between the upper 1914-A and lower 1914-B volumes to which the annular reciprocating magnet reciprocates, to close off in proportion to the over-travel distance, which serves to slow and arrest further over-travel.

Lower valves 1904-B allow the lower volume of fluid 1914-B to travel to the upper side through conduit 1910-B and central conduit 1905. This may be reflected on the upper side, whereby upper valves 1904-A allow the upper volume of fluid 1914-A to travel to the lower side through conduit 1910-A and central conduit 1905.

FIG. 23*b* illustrates the magnet stack impacting the lower valve 1904-B and causing a deformation of the material such that it restricts the flow in the 1910-B conduit.

FIG. 23*c* illustrates configuration 1900 with the addition of upper leakage channel 1906-A and lower leakage channel 1906-B. These serve to provide a leakage-path, bypassing the valve(s) 1904-A/B which may be required to release the magnet stack, should it get stuck at one of the upper or lower extremes of over-travel.

Figure 24:
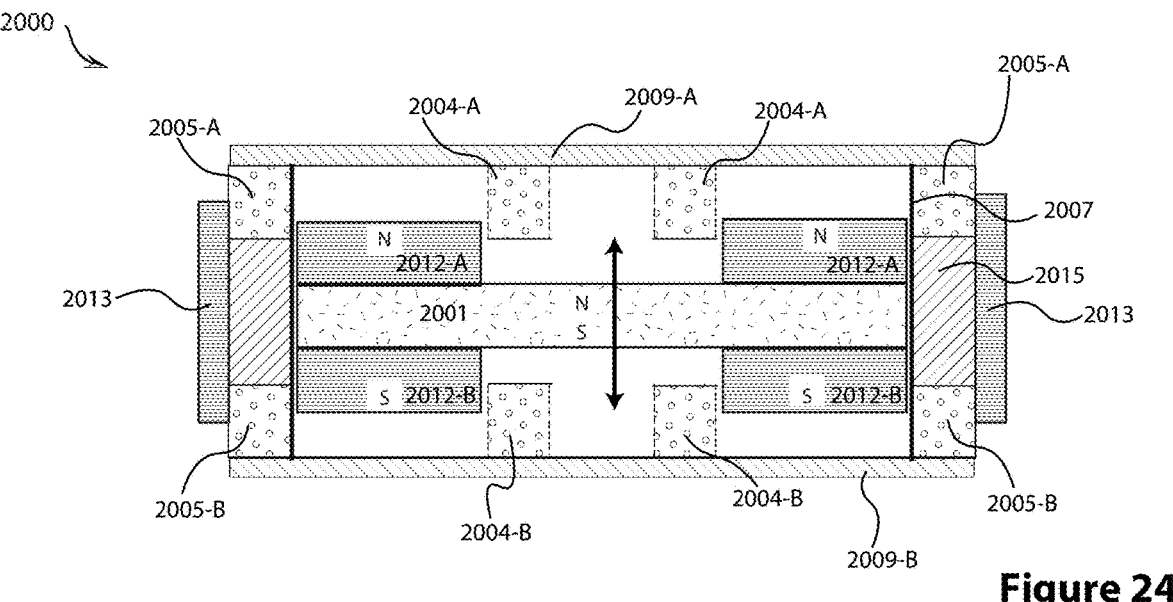

FIG. 24 illustrates transducer configuration 2000. Con-figuration 2000 is a variation of configuration 1500. How-ever, instead of using an annular magnet for the reciprocating magnet. Instead, a disc magnet may be employed, whereby yolks located on the upper 2012-A and lower 2012-B surface of the disc magnet 2001. Thus, the recipro-cating magnetic structure may include two annular portions, one either side of the disc magnet, with each annular portion including four edges of which each can be electromagneti-cally influenced, as it is with using an annular magnet. Using a disc magnet may be less costly than a magnet that has an annulus.

Upper central solenoid 2004-A influences the inner boundary of the yoke 2012-A aperture, whereas the upper outer solenoid 2005-A influences the outer boundary of upper yoke 2012-A. Both solenoids 2004-A and 2005-A may be mounted to upper connecting surface 2009-A.

On the opposing side, the lower central solenoid 2004-B influences the inner boundary of the yoke 2012-B aperture, whereas the lower outer solenoid 2005-B influences the outer boundary of lower yoke 2012-B. Both solenoids 2004-B and 2005-B may be mounted to lower connecting surface 2009-B.

The outer axial face of the reciprocating magnet assembly, comprising disc magnet 2001 and upper 2012-A and lower 2012-B yolk may have a smooth surface such that it forms a linear bearing when contained within outer wall 2015. For the same reason of creating a linear bearing, the inner surface of the outer wall 2015 may smooth and may have a layer of low friction material 2007 added to further reduce friction.

Surrounding the outer radial boundaries of the outer solenoids 2005-A and 2005-B a yoke 2013 may be placed to guide the magnetic field from the upper yolk 2012-A to the lower yolk 2012-B through the outer upper 2005-A and lower 2005-B solenoid.

The upper central solenoid 2004-A, upper outer solenoid 2005-A, lower central solenoid 2004-B lower outer solenoid 2005-B may be configured such that the magnetic field influences the reciprocating disc magnet 2001 in a common direction.

Although not illustrated in FIG. 24, it will be appreciated that the reciprocating magnet may suspended or supported mechanically e.g. in one of the numerous ways described herein, or magnetically, for instance in one of ways described herein.

For all of the examples herein, all flux producing perma-nent magnets may be replaced by electromagnets, such as the reciprocating magnet of configuration 100.

Electrical power to an electromagnetic reciprocating mag-net may come from sliding contacts. The sliding contacts may be located on the outer surface of the central spacer the inner surface of the outer spacer. Electrical power to the electromagnetic reciprocating magnet may be routed through the suspension springs located on either side of the electromagnetic reciprocating electromagnet.

Although various aspects of the invention are set out in the independent claims, other aspects of the invention com-prise other combinations of features from the described embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

23

24

The invention claimed is:

1. A transducer configured to convert electrical signals into vibrational movement, the transducer comprising:

an axially-magnetised reciprocating magnet mechanically supported or suspended in a null position in a plane that is between a first pair of at least two pairs of concentrically positioned electromagnetic solenoids and a second pair of the at least two pairs of concentrically positioned electromagnetic solenoids, wherein the at least two pairs of concentrically positioned electromagnetic solenoids are configured to drive the reciprocating magnet to reciprocate about the null position, wherein the axially-magnetised reciprocating magnet comprises an aperture such that the reciprocating magnet has an inner boundary and an outer boundary, wherein a first solenoid of each of the pairs of concentrically positioned electromagnetic solenoids is positioned to influence the reciprocating magnet at the inner boundary more than at the outer boundary, and a second solenoid of each of the pairs of concentrically positioned electromagnetic solenoids is positioned to influence the reciprocating magnet at the outer boundary more than at the inner boundary.

2. The transducer of claim 1, wherein, when viewed along the axis of reciprocation of the axially-magnetised reciprocating magnet, the first solenoid of each of the pairs of concentrically positioned electromagnetic solenoids is located within the aperture of the reciprocating magnet, and the second solenoid of each of the pairs of concentrically positioned electromagnetic solenoids is located outside the outer boundary of the reciprocating magnet.

3. The transducer of claim 1, comprising a central guide member, wherein a volume in which the reciprocating ring magnet is driven to reciprocate surrounds the central guide member and the central guide member extends through the aperture of the reciprocating magnet, the at least two pairs of concentrically positioned electromagnetic solenoids being configured to drive the reciprocating magnet to reciprocate along a length of the central guide member.

4. The transducer of claim 1, comprising an outer guide member surrounding and defining an outer boundary of the volume in which the reciprocating magnet is driven to reciprocate.

5. The transducer of claim 1, wherein an outer surface of the central guide member that is adjacent the inner boundary of the reciprocating magnet and an inner surface of the outer guide member that is adjacent the outer boundary of the reciprocating magnet are formed of a material which reduces friction between the reciprocating magnet and the central and outer guide members.

6. The transducer of claim 1, wherein the second solenoid of each of the pairs of concentrically positioned electromagnetic solenoids is located within, or forms part of, the outer guide member.

7. The transducer of claim 1, wherein the first solenoid of each of the pairs of concentrically positioned electromagnetic solenoids is located within, or forms part of, the central guide member.

8. The transducer of claim 1, wherein:

the central guide member includes a central guide member fluid channel extending through a central region of the central guide member to allow fluid to pass through the central region of the central guide member between a first end of the central guide member and a second end of the central guide member;

the transducer includes at least one second fluid channel configured to allow fluid to pass between the volume in which the axially-magnetised reciprocating magnet is driven to reciprocate and the first end of the central guide member fluid channel; and the transducer includes at least one third fluid channel configured to allow fluid to flow between the volume in which the axially-magnetised reciprocating magnet is driven to reciprocate and a second end of the central guide member fluid channel.

9. The transducer of claim 1, wherein the reciprocating magnet comprises:

a first main surface which faces the first axially-magnetised stationary magnet;

a second main surface which faces the second axially-magnetised stationary magnet;

an inner surface extending between the first and second main faces at the inner boundary of the reciprocating magnet; and an outer surface extending between the first and second main faces at the outer boundary of the reciprocating magnet, and wherein:

an edge of the first solenoid of a first of the pairs of concentrically positioned electromagnetic solenoids is positioned adjacent an edge of the reciprocating magnet that connects the first main surface and the inner surface;

an edge of the first solenoid of a second of the pairs of concentrically positioned electromagnetic solenoids is positioned adjacent an edge of the reciprocating magnet that connects the second main surface and the inner surface;

an edge of the second solenoid of a first of the pairs of concentrically positioned electromagnetic solenoids is positioned adjacent an edge of the reciprocating magnet that connects the first main surface and the outer surface; and an edge of the second solenoid of a second of the pairs of concentrically positioned electromagnetic solenoids is positioned adjacent an edge of the reciprocating magnet that connects the second main surface and the outer surface.

10. The transducer of claim 1, wherein the axially-magnetised reciprocating magnet is mechanically supported or suspended in the null position by one or more mechanical spring members.

11. The transducer of claim 10, wherein the one or more mechanical spring members are positioned on at least one side of the axially-magnetised reciprocating magnet.

12. The transducer of claim 10, wherein the one or more mechanical spring members comprise one or more of: wave springs, compression springs, expansion springs or foam rubber structures.

13. The transducer of claim 12, wherein the one or more mechanical spring members comprise at least one spring positioned on each side of the axially-magnetised reciprocating magnet.

14. The transducer of claim 10, wherein the one or more mechanical spring members may comprise at least one elastic flexure positioned on at least one side of the axially-magnetised reciprocating magnet.

15. The transducer of claim 14, wherein the elastic flexure is located external to the transducer.

16. The transducer of claim 10, wherein the axially-magnetised reciprocating magnet is an assembly comprised of one or more axially-magnetised permanent magnets attached to a magnetic yoke.

17. The transducer of claim 16, wherein the magnetic yoke is shaped in a way that increases the electromagnetic coupling between the reciprocating magnet assembly and the electromagnetic solenoids.

18. A transducer configured to convert electrical signals into vibrational movement, the transducer comprising:

at least two pairs of concentrically positioned electromagnetic solenoids;

an axially-magnetised reciprocating magnet magnetically suspended in a null position in a plane that is between a first pair of at least two pairs of concentrically positioned electromagnetic solenoids and a second pair of the at least two pairs of concentrically positioned electromagnetic solenoids, wherein the axially-magnetised reciprocating magnet comprises an aperture such that the reciprocating magnet has an inner boundary and an outer boundary, wherein the at least two pairs of concentrically positioned electromagnetic solenoids are configured to drive the reciprocating magnet to reciprocate about the null position, at least one stationary magnet arranged to magnetically support the axially-magnetised reciprocating magnet in the null position, the at least one stationary magnet being positioned inside the inner boundary of the axially-magnetised reciprocating magnet and/or outside the outer boundary of the axially-magnetised reciprocating magnet; wherein a first solenoid of each of the pairs of concentrically positioned electromagnetic solenoids is positioned to influence the reciprocating magnet at the inner boundary more than at the outer boundary, and a second solenoid of each of the pairs of concentrically positioned electromagnetic solenoids is positioned to influence the reciprocating magnet at the outer boundary more than at the inner boundary.

19. The transducer of claim 18, wherein the at least one stationary magnet is made up of a plurality of smaller magnets which surrounding the axially-magnetised reciprocating magnet on the inner boundary of the axially-magnetised reciprocating magnet and/or outside the outer boundary of the axially-magnetised reciprocating magnet.

20. The transducer of claim 18, wherein the axially-magnetised reciprocating magnet have extended pole pieces attached to the axial poles of the magnet.

21. The transducer of claim 20, wherein the extended pole pieces attached to the axial poles of the magnet are made of a ferromagnetic material.

* * * * *